United States Patent
Kunieda et al.

(10) Patent No.: US 10,796,405 B2
(45) Date of Patent: Oct. 6, 2020

(54) IMAGE PROCESSING APPARATUS AND METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventors: Hiroyasu Kunieda, Yokohama (JP); Shinjiro Hori, Yokohama (JP); Ryosuke Iguchi, Inagi (JP); Masaaki Obayashi, Kawasaki (JP); Tohru Ikeda, Yokohama (JP); Fumitaka Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 15/907,408

(22) Filed: Feb. 28, 2018

(65) Prior Publication Data

US 2018/0268520 A1  Sep. 20, 2018

(30) Foreign Application Priority Data

Mar. 14, 2017  (JP) .................................. 2017-049055

(51) Int. Cl.
 *G06K 9/36* (2006.01)
 *G06T 3/40* (2006.01)
 *G06T 11/60* (2006.01)

(52) U.S. Cl.
 CPC ................ *G06T 3/40* (2013.01); *G06T 11/60* (2013.01); *G06T 2210/22* (2013.01)

(58) Field of Classification Search
 CPC .......... G06F 16/51; G06F 16/58; G06F 16/50; H04N 1/00196; G06K 9/00261
 USPC ....................................................... 382/282
 See application file for complete search history.

(56) References Cited

U.S. PATENT DOCUMENTS

| | | | |
|---|---|---|---|
| 6,904,181 B1 | 6/2005 | Shinbata et al. | |
| 7,006,668 B2 | 2/2006 | Iguchi et al. | |
| 7,167,205 B2 | 1/2007 | Akiyama et al. | |
| 7,432,985 B2 | 10/2008 | Ishikawa et al. | |
| 7,738,030 B2 | 6/2010 | Akiyama et al. | |
| 7,924,469 B2 | 4/2011 | Ono et al. | |
| 7,944,588 B2 | 5/2011 | Yamada et al. | |
| 8,008,562 B2 | 8/2011 | Ikeda et al. | |
| 8,040,551 B2 * | 10/2011 | Ono .................... | G11B 27/034 358/1.18 |
| 8,102,558 B2 | 1/2012 | Goto et al. | |
| 8,175,155 B2 | 5/2012 | Suwa et al. | |
| 8,237,991 B2 | 8/2012 | Ono et al. | |
| 8,405,876 B2 | 3/2013 | Nakatani et al. | |
| 8,472,076 B2 | 6/2013 | Ikeda | |
| 8,600,154 B2 | 12/2013 | Umeda et al. | |
| 8,620,105 B2 | 12/2013 | Hori et al. | |
| 8,675,249 B2 | 3/2014 | Umeda et al. | |
| 8,929,681 B2 | 1/2015 | Umeda et al. | |
| 9,036,205 B2 | 5/2015 | Umeda et al. | |
| 9,052,742 B2 | 6/2015 | Hori et al. | |
| 9,088,753 B2 | 7/2015 | Akiba et al. | |

(Continued)

FOREIGN PATENT DOCUMENTS

JP          2008-225720 A       9/2008

*Primary Examiner* — Charlotte M Baker

(74) *Attorney, Agent, or Firm* — Venable LLP

(57) ABSTRACT

The position of a trimming region is decided in accordance with a scene type represented by an image which is a layout target. The trimming region is trimmed at the decided position.

20 Claims, 21 Drawing Sheets

(56) References Cited

U.S. PATENT DOCUMENTS

| | | | |
|---|---|---|---|
| 9,189,681 B2 | 11/2015 | Kunieda et al. | |
| 9,214,027 B2 | 12/2015 | Sumi et al. | |
| 9,275,270 B2 | 3/2016 | Suwa et al. | |
| 9,569,831 B2 | 2/2017 | Song et al. | |
| 9,594,534 B2 | 3/2017 | Sasaki et al. | |
| 9,602,691 B2 | 3/2017 | Miyake et al. | |
| 9,648,198 B2 | 5/2017 | Ishida et al. | |
| 9,704,221 B2 | 7/2017 | Hori et al. | |
| 9,769,352 B2 | 9/2017 | Yanai et al. | |
| 9,769,380 B2 | 9/2017 | Iguchi et al. | |
| 10,157,182 B2 * | 12/2018 | Takenouchi | G06T 11/60 |
| 2012/0268759 A1 | 10/2012 | Ono et al. | |
| 2014/0013213 A1 | 1/2014 | Kajiwara et al. | |
| 2014/0078157 A1 * | 3/2014 | Suzuki | G06T 1/20 345/505 |
| 2017/0039427 A1 | 2/2017 | Yamamoto et al. | |
| 2017/0039746 A1 | 2/2017 | Mizoguchi et al. | |
| 2017/0309011 A1 | 10/2017 | Hori et al. | |
| 2017/0316558 A1 | 11/2017 | Hori et al. | |

\* cited by examiner

F I G. 5

| IMAGE ID | SHOOTING DATE/TIME | FOCUS | FACE COUNT | PERSONAL ID | | | | | | | |
|---|---|---|---|---|---|---|---|---|---|---|---|
| | | | | 1 | | 2 | | 3 | | | |
| | | | | UPPER LEFT POSITION | LOWER RIGHT POSITION | UPPER LEFT POSITION | LOWER RIGHT POSITION | UPPER LEFT POSITION | LOWER RIGHT POSITION | | ... |
| 1 | 2015/7/1 10h11m12s | ○ | 6 | 40,40 | 65,65 | 90,40 | 115,65 | 10,20 | 25,35 | | ... |
| 2 | 2015/7/1 10h12m30s | ○ | 2 | 50,100 | 100,150 | 150,125 | 190,65 | 150,125 | 190,165 | | ... |
| 3 | 2015/7/1 10h15m54s | ○ | 0 | - | - | - | - | - | - | | ... |
| ... | ... | ... | ... | ... | ... | ... | ... | ... | ... | | ... |

FIG. 7

| SCENE | SHOOTING PERIOD (TIME) | | NUMBER OF SHOT IMAGES | | NUMBER OF SHOT PEOPLE | |
|---|---|---|---|---|---|---|
| | AVERAGE | STANDARD DEVIATION | AVERAGE | STANDARD DEVIATION | AVERAGE | STANDARD DEVIATION |
| TRIP | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG. 8A

| SCENE | IMAGE FEATURE OF MAIN SLOT | IMAGE FEATURE OF SUB-SLOT |
|---|---|---|
| TRIP | LONG SHOT IMAGE INCLUDING PERSON AND SCENERY | CLOSE-UP IMAGE OR IMAGE OF FACE IN PROFILE |
| DAILY LIFE | CLOSE-UP IMAGE OR IMAGE OF FACE IN PROFILE | LONG SHOT IMAGE INCLUDING PERSON AND SCENERY |
| CEREMONY | IMAGE INCLUDING TWO PEOPLE CLOSE TO EACH OTHER | IMAGE OF MANY PEOPLE |

FIG. 8B

| IMAGE ID | SCORE (MAXIMUM OF 50 POINTS) | |
|---|---|---|
| | MAIN SLOT (POINTS) | SUB-SLOT (POINTS) |
| 1 | 20 | 40 |
| 2 | 45 | 10 |
| 3 | 10 | 20 |
| ... | ... | ... | ical storage medium storing a program.

IMAGE PROCESSING APPARATUS AND METHOD, AND NON-TRANSITORY COMPUTER-READABLE STORAGE MEDIUM STORING PROGRAM

BACKGROUND OF THE INVENTION

Field of the Invention

The present invention relates to an image processing apparatus and method for laying out image data and to a non-transitory computer-readable storage medium storing a program.

Description of the Related Art

In recent years, in addition to the proliferation of digital cameras, smart devices are spread and camera performance has improved to abruptly increase the number of shot photos. A photo album has received a great deal of attention as a target for utilizing a large number of shot photos. In photo album creation, needs are required for an automatic operation of selecting and laying out images suitable for an album from a large number of photos and design improvement by trimming the selected photos in a circular or rectangular shape and laying them out. Japanese Patent Laid-Open No. 2008-225720 discloses a technique of setting a trimming position in trimming such that a detected face becomes the center.

However, the face region which is offset from the center may be suitable for the user's composition considered at the time of shooting depending on an image shooting scene. Even if trimming is performed by the technique described in Japanese Patent Laid-Open No. 2008-225720 such that the face region is located at the center, the user may feel discomfort depending on the type of scene.

SUMMARY OF THE INVENTION

An aspect of the present invention is to eliminate the above-mentioned problems with the conventional technology. The present invention provides image processing apparatus and method for performing trimming for a trimming region which is an appropriate position corresponding to the type of scene, and a non-transitory computer-readable storage medium storing a program.

The present invention in one aspect provides an image processing apparatus comprising: a scene determination unit configured to determine a scene type represented by an image by analyzing the image which is a layout target; a position determination unit configured to determine a position of a trimming region in accordance with the scene type determined by the scene determination unit; and a trimming unit configured to trim the trimming region corresponding to the position decided by the position determination unit.

According to the present invention, trimming can be performed for a trimming region which is an appropriate position corresponding to the type of scene.

Further features of the present invention will become apparent from the following description of exemplary embodiments with reference to the attached drawings.

BRIEF DESCRIPTION OF THE DRAWINGS

FIG. 5 is a table showing analysis information stored for each image;

FIG. 7 is a table showing the average value and standard deviation of each scene;

FIGS. 8A and 8B are tables for explaining scoring operations for each scene and each slot;

DESCRIPTION OF THE EMBODIMENTS

Figure 1:
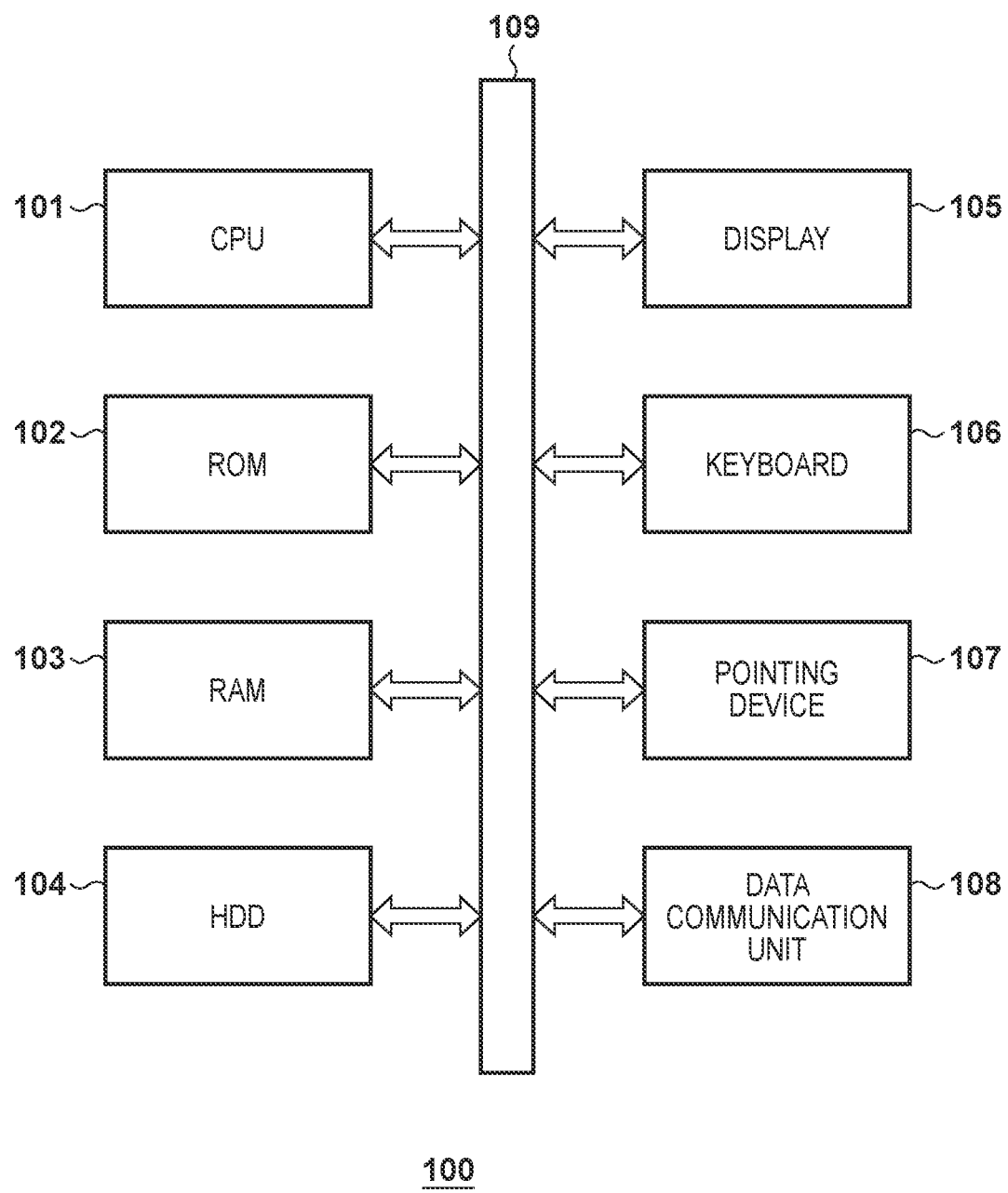
FIG. 1 is a block diagram showing a hardware arrangement of an image processing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components, and a description thereof will be omitted.

First Embodiment

This embodiment will describe processing for operating an album creation application on a PC (Personal Computer) and generating the automatic layout of a photo album.

FIG. 1 is a block diagram showing the hardware arrangement of an image processing apparatus 100. For example, a general-purpose PC is used as the image processing apparatus 100. A CPU 101 is a central processing unit (processor) and executes an album creation application for performing automatic layout generation of a photo album. In FIG. 1, only one CPU is illustrated as the CPU 101. However, a plurality of CPUs may be used. A ROM 102 stores, for example, programs to be executed by the CPU 101. A RAM 103 is, for example, used as a memory for temporarily storing various kinds of information at the execution of programs by the CPU 101. An HDD (Hard Disk) 104 is, for example, a storage medium for storing image data (to be also referred to as an image simply) and a database for holding processing results such as image analysis.

A display 105 displays, to the user, the screen of a user interface (UI) and an image layout result in this embodiment. The display 105 may have a touch sensor function. A keyboard 106 is, for example, used to input setting values such as an album double spread count on a UI screen displayed on the display 105. A pointing device 107 is used when the user selects/designates a button by a click on the UI displayed on the display 105. A data communication unit 108 transmits, to a printer and server connected to the image processing apparatus 100, the data obtained by automatic layout generation. The respective blocks described above are connected to each other via a system bus 109.

Figure 2:
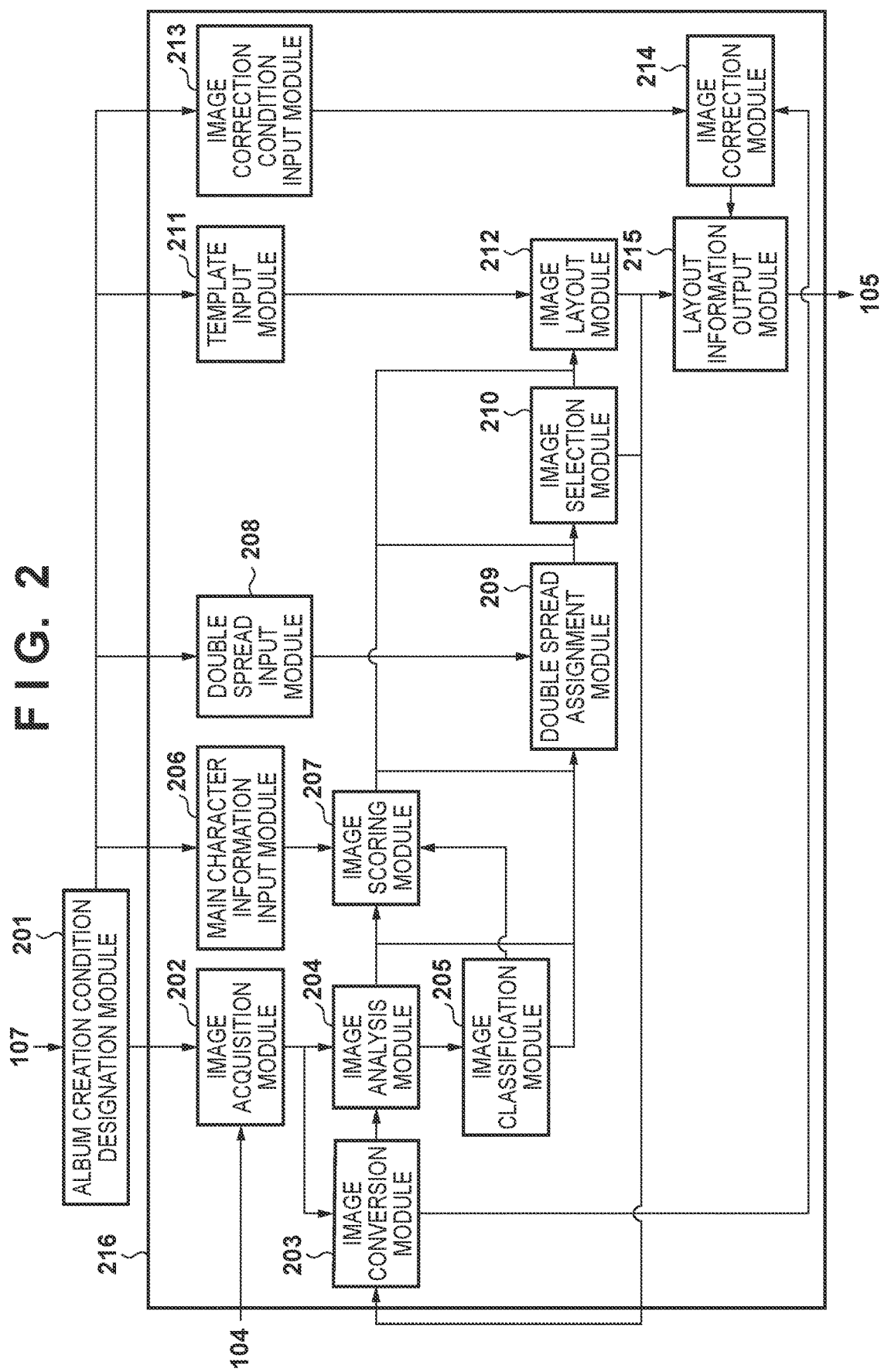
FIG. 2 is a block diagram showing the software configuration of an album creation application.

FIG. 2 is a software block diagram concerning an automatic layout processing unit 216 of the album creation application. Referring to FIG. 2, an album creation condition designation module 201 outputs, to the automatic layout processing unit 216, an album creation condition designated by a UI operation (to be described later) by the pointing device 107.

An image acquisition module 202 acquires, from the HDD 104, an image group designated by the album creation condition designation module 201. The image group stored in the HDD 104 includes still images shot by a digital camera or smart device, images extracted from moving images, and SNS images acquired from a social network or server via the data communication unit 108. The image acquisition module 202 determines an acquisition source by analyzing data added to each image. For example, the SNS images may be acquired from the SNS via the album creation application, and the determined acquisition source may be managed in the album creation application. In this embodiment, images other than the above types of images may also be used.

An image conversion module 203 converts an image into an image having a desired pixel count or color information. In this embodiment, the image conversion module 203 converts an image into an analysis image having a pixel count of 420 pixels along a short side and sRGB color information. An image analysis module 204 executes processing operations of feature amount acquisition, face detection, expression recognition, and personal recognition, all of which will be described later, for the analysis image. The image analysis module 204 also acquires shooting date/time from data such as Exif information added to an image acquired from the HDD 104. In addition, the image analysis module 204 analyzes image data to detect a specific object such as the face image of a person. An image classification module 205 executes scene division or scene classification (to be described later) of the image group using shooting date/time information, a photo count, and the detected face information. In this case, the scene represents a shooting scene such as the scene of a trip, daily life, wedding ceremony, or the like.

An image scoring module 207 scores each image such that an image suitable for the layout has a high score. Although scoring will be described later, scoring uses information acquired from the image analysis module 204 and information acquired by the image classification module 205. A main character information input module 206 inputs, to the image scoring module 207, the ID (identification information) of a main character designated by the album creation condition designation module 201. The image scoring module 207 increases, for example, the score of an image including the main character ID input from the main character information input module 206.

A double spread assignment module 209 divides an image group and assigns the divided images to each double spread. A double spread input module 208 inputs, to the double spread assignment module 209, the album double spread count designated by the album creation condition designation module 201. The double spread assignment module 209 divides the image group in accordance with the input double spread count and assigns some images of the image group to each double spread. On the basis of the score given by the image scoring module 207, an image selection module 210 selects images from some images of the image group assigned to each double spread by the double spread assignment module 209. An image layout module 212 decides an image layout.

A template input module 211 inputs, to the image layout module 212, a plurality of templates corresponding to the template information designated by the album creation condition designation module 201. The image layout module 212 selects a template suitable for an image selected by the image selection module 210 from the plurality of templates input from the template input module 211 and decides the image layout. A layout information output module 215 outputs layout information for display on the display 105 in accordance with the image layout decided by the image layout module 212. The layout information is, for example, bitmap data in which the selected images are laid out in the selected template.

An image correction condition input module 213 inputs, to the image correction module 214, image correction ON/OFF condition designated by the album creation condition designation module 201. An image correction module 214 executes the correction for the image when the image correction condition is ON, and does not execute the correction when the image correction condition is OFF. Note that on the basis of the image correction condition, the image correction module 214 controls correction execution for the image input from the image conversion module 203. The number of pixels of an image input from the image conversion module 203 to the image correction module 214 can be changed in accordance with each slot size of the layout decided by the image layout module 212.

When the album creation application is installed in the image processing apparatus 100, an activation icon is displayed on the top screen (desktop) of an OS (Operating System) operating on the image processing apparatus 100. When the user double-clicks, with the pointing device 107, the activation icon on the desktop displayed on the display 105, the album creation application program stored in the HDD 104 is loaded to the ROM 102 and executed by the CPU 101, thereby activating the album creation application.

Figure 3:
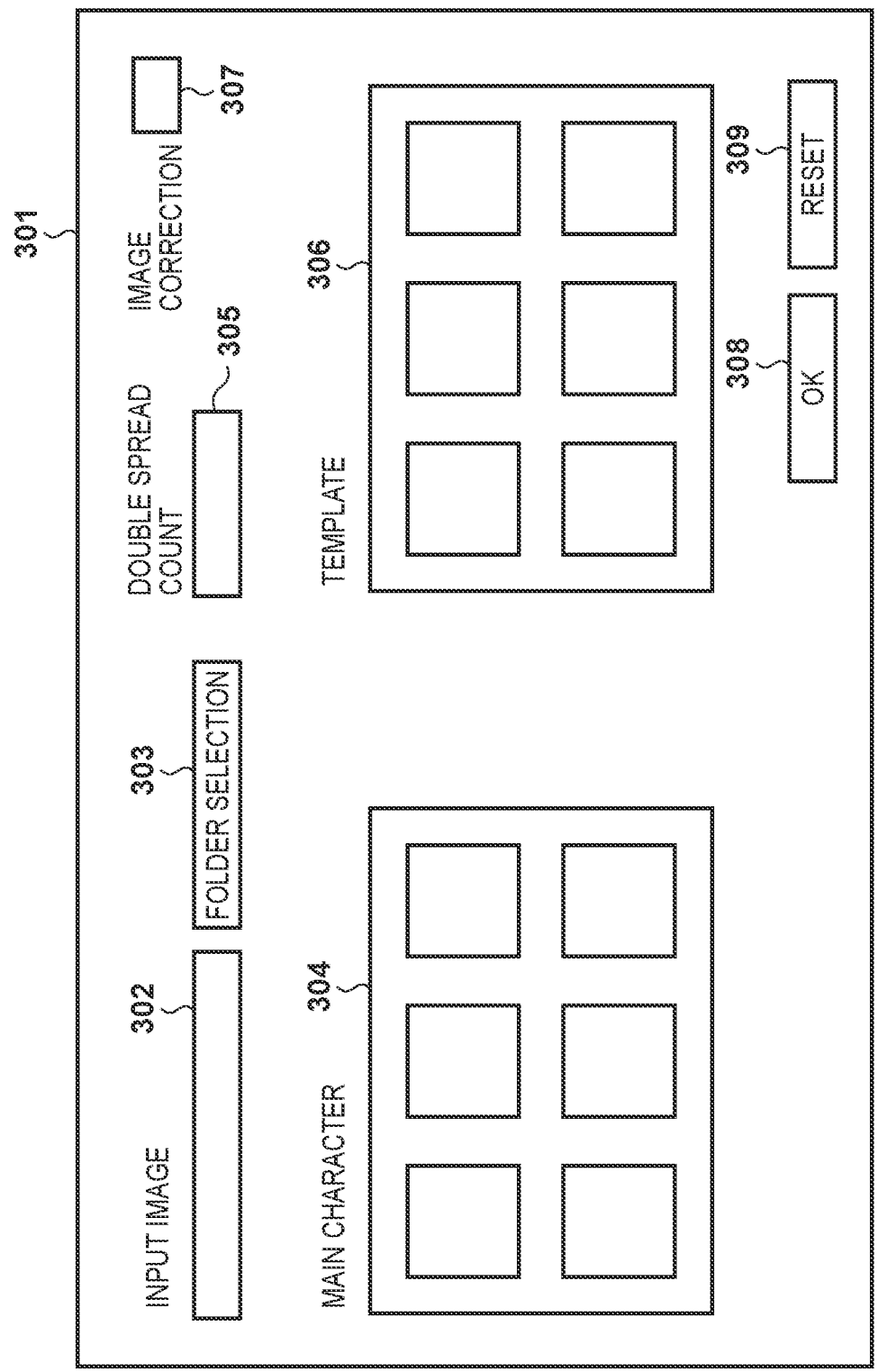
FIG. 3 is a view showing the user interface screen of the album creation application.

FIG. 3 shows a UI screen 301 of the activated album creation application. The UI screen 301 is displayed on the display 105. A path box 302 is a path box indicating the storage location (path) as the album creation target in the HDD 104. For example, when the user clicks a folder selection button 303 with the pointing device 107 by the user, folders including the image group serving as the album creation target are displayed to allow selection in a tree structure. The folder path including the image group selected by the user is displayed in the path box 302.

The icons of different face images are aligned and displayed in main character designation icons 304 and is selected by a click operation of the pointing device 107. A double spread count box 305 accepts designation of a double spread count. For example, a numerical value is directly input to the double spread count box 305 by an operation with the keyboard 106 or a numerical value is input from a list to the double spread count box by an operation with the pointing device 107.

Icons indicating template sizes and template tastes (for example, a pop mode or chic mode) are aligned and displayed in template designation icons 306. One of the icons can be selected by a click operation with the pointing device 107. A check box 307 accepts ON/OFF designation of image correction. When the check box 307 is checked with the pointing device 107 or the like, image correction is set ON; otherwise, image correction is set OFF.

An OK button 308 is a button for outputting the designated state on the UI screen 301 to the album creation condition designation module 201. When the user clicks the OK button 308 with, for example, the pointing device 107, the album creation condition designation module 201 outputs the album creation condition to the automatic layout processing unit 216. The path input to the path box 302 is output to the image acquisition module 202. The ID of the main character selected by the main character designation icons 304 is output to the main character information input module 206. The double spread count input to the double spread count box 305 is output to the double spread input module 208. The template information selected by the template designation icons 306 is output to the template input module 211. The image correction ON/OFF information in the image correction check box is output to the image correction condition input module 213. A reset button 309 is a button for resetting each setting information on the UI screen 301.

Figure 4A:
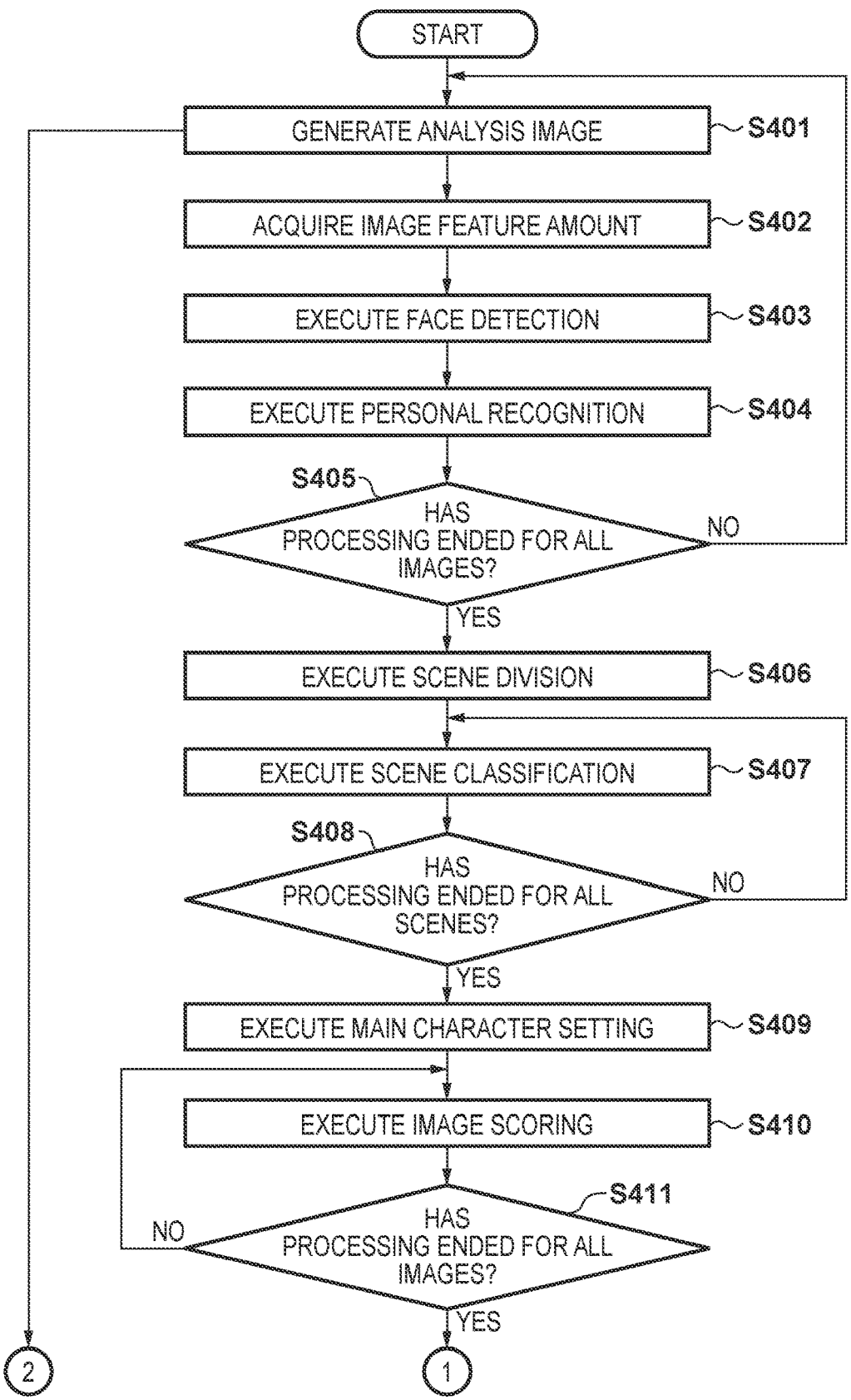
FIGS. 4A and 4B are flowcharts showing processing of the album creation application.
Figure 4B:
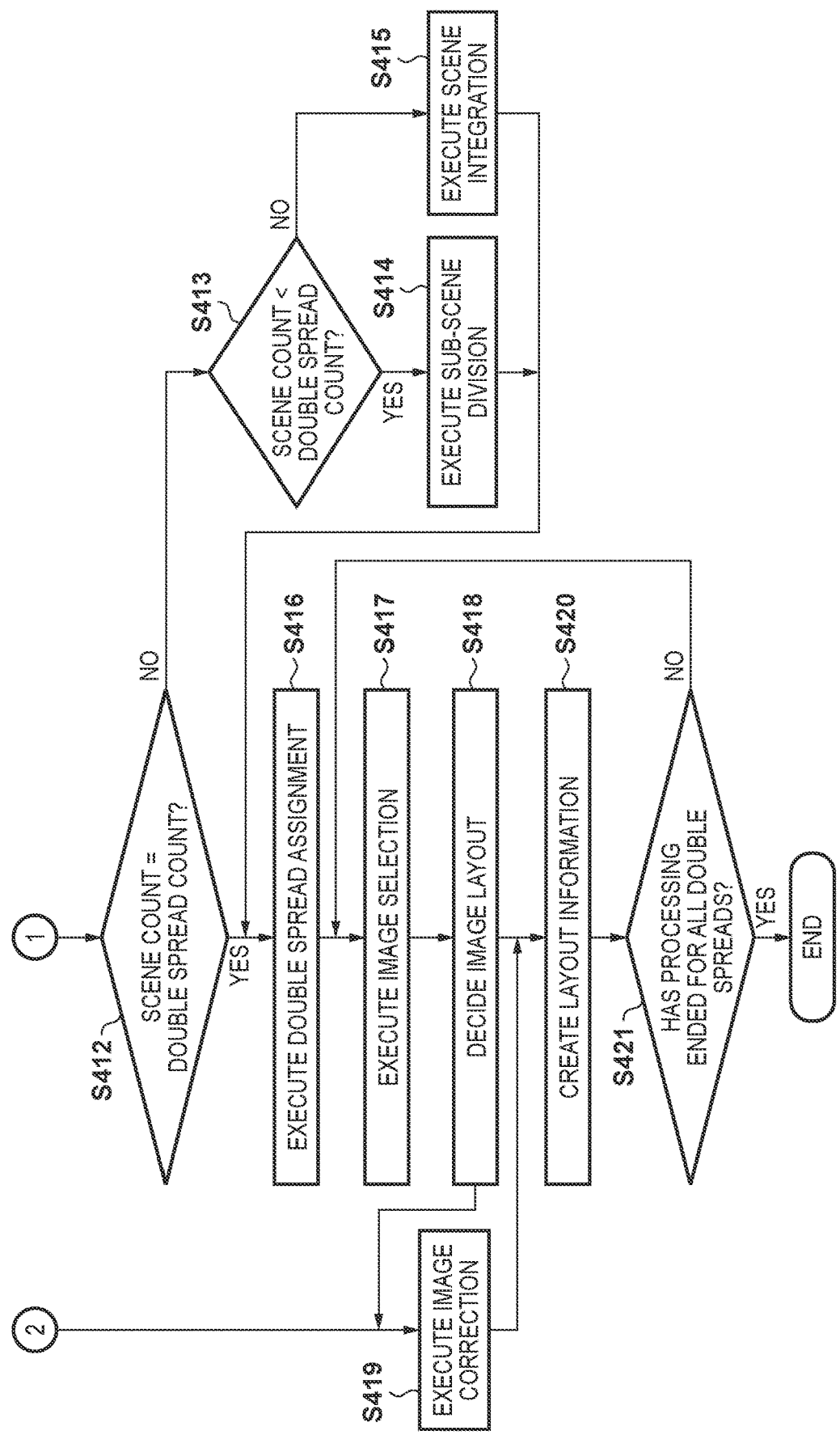

FIGS. 4A and 4B are flowcharts showing processing of the automatic layout processing unit 216 of the album creation application. The processing in FIGS. 4A and 4B is implemented, for example, when the CPU 101 reads out the program stored in the ROM 102 to the RAM 103 and executes it. The automatic layout generation processing of the album creation application will be described with reference to FIGS. 4A and 4B.

In step S401, the image conversion module 203 generates the analysis image. The image conversion module 203 converts each image of the image group stored in the HDD 104 and designated by the album creation condition designation module 201 into an analysis image having a desired pixel count and color information. In this embodiment, the image conversion module 203 converts an image into, for example, an analysis image having 420 pixels along the short side and sRGB color information.

In step S402, the image analysis module 204 acquires the feature amount of the image. The image analysis module 204 acquires shooting date/time from, for example, Exif information added to each image acquired from the HDD 104. The image analysis module 204 may acquire, for example, focus information as the feature amount from the analysis image generated in step S401. To acquire focus information, the image analysis module 204 detects an edge with a Sobel filter and calculates an edge gradient obtained by dividing the luminance difference between the start and end points of the edge by a distance between the start and end points. The image analysis module 204 then calculates the average gradient of the edges in the image and determines that an image having a larger average gradient is in focus as compared with an image having a smaller average gradient. Alternatively, the focus amount may be determined such that a plurality of thresholds having different values are set for each gradient to determine whether each gradient is equal to or larger than a specific one of the plurality of thresholds. For example, the image analysis module 204 sets two different thresholds and determines the focus amount in three levels, that is, ○, Δ, and x. That is, the gradient of the focus to be employed in the album is evaluated as ○, the gradient of the focus allowable in the album is evaluated as Δ, and the gradient of the focus not allowed in the album is evaluated as x. For example, the thresholds are set in advance by an experiment or the like.

In step S403, the image analysis module 204 executes face detection. The image analysis module 204 executes face detection from the analysis image generated in step S401. The face detection is executed by a strong discriminator generated by Adaboost from a plurality of prepared weak discriminators. The image analysis module 204 detects the face image and acquires the upper left coordinate value and lower right coordinate value of the position of the detected face image. By having these two kinds of coordinates, the image analysis module 204 can acquire the number of faces and the position and size of the face image.

In step S404, the image analysis module 204 performs personal recognition. The image analysis module 204 determines the similarities between the face image detected in step S403 and representative face images saved in a face dictionary database for respective personal IDs. The image analysis module 204 sets, as the ID of the detected face image, an ID having the highest similarity which is equal to or larger than a threshold. Note that if the similarity is smaller than the threshold, the image analysis module 204 registers the extracted face image as a new face with a new personal ID in the face dictionary database.

The information acquired in steps S402 to S404 is discriminated for each image ID for identifying each image and stored as shown in FIG. 5. As shown in FIG. 5, the shooting date/time information and focus information acquired in step S402 and the number of faces and the face position information detected in step S403 are stored. Note that the face position information is discriminated for each personal ID acquired in step S404 and stored.

In step S405, it is determined whether processing in steps S401 to S404 has ended for all the images of the image group stored in the HDD 104 and designated by the album creation condition designation module 201. If NO in step S405, processing from step S401 is repeated; otherwise, the process advances to step S406.

Figure 6:
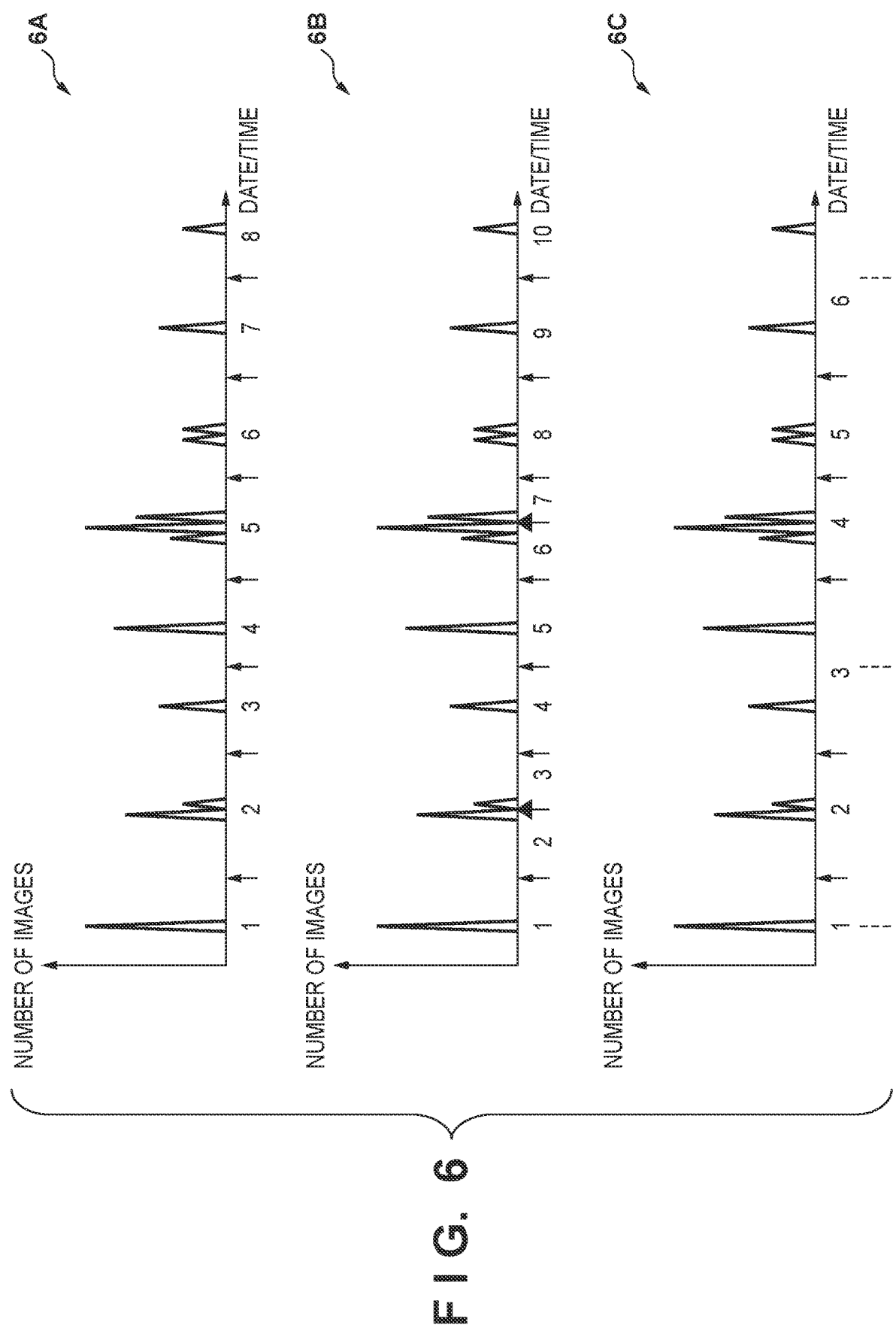
FIG. 6 shows graphs showing scene division results.

In step S406, the image classification module 205 executes scene division. The image classification module 205 divides the image group into a plurality of image groups based on the time difference between the images calculated from the shooting date/time information acquired in step S402. In this case, if a non-shooting day is present between the images, the images are divided using that day as the boundary. If the shooting days are continuous and the time difference between the shot images is 16 hours or longer, the images are divided using the portion of this time difference as a boundary. If the time difference is shorter than 16 hours, and the time difference from the first shooting to the last shooting of each day of the continuous days is shorter than 4 hours, the images obtained from the first shooting to the last shooting of each day are collected as a group. If the time difference is equal to or longer than 4 hours, and the number of shot images of each of the continuous days is less than 50, these images are collected as the group. To the contrary, if the number of images is equal to or larger than 50, no division is made. 6A in FIG. 6 shows the result obtained by division according to the scene division method described above.

In step S407, the image classification module 205 executes scene classification for deciding the types of scenes. This embodiment will exemplify a case in which the scenes are classified into scenes of trip, daily life, and ceremony. The image classification module 205 collects a plurality of image groups determined by the user in advance as the scenes of trip, daily life, and ceremony. The image analysis module 204 acquires feature amounts for each image group. The feature amounts acquired here are, for example, a shooting period, the number of shot images, and the number of shot people. The shooting period is a time difference from the first shooting to the last shooting of each image group. The number of shot images is the number of shot images in each image group. The number of shot people is the number of faces in an image in which the faces are shot. The average value and standard deviation of the shooting periods, the average value and standard deviation of the number of shot images, and the average value and standard deviation of the number of people per image are obtained for the plurality of image groups collected for the respective scenes.

FIG. 7 shows the average values and standard deviations obtained as described above. These obtained values are incorporated in the album creation application program in advance. After the album creation application is activated, the shooting period, the number of shot images, and the average value of the numbers of shot people for each division group scene-divided in step S406 out of the image group designated by the user with the path box 302 are calculated as the feature amounts. The feature amounts of each division group are scored by equations (1) and (2) using the average value and standard deviation for each scene in FIG. 7.

$$\text{Score}=50-|10\times(\text{average value}-\text{feature amount})/\text{standard deviation}| \quad (1)$$

$$\text{Average score}=(\text{score of shooting period}+\text{score of number of shot images}+\text{score of number of shot people})/\text{number of feature amount items} \quad (2)$$

As described above, the average score for the scene of trip, daily life, or ceremony is calculated for each division group. The division groups are classified to a scene of the highest point for each division group, thereby deciding the types of scenes of the division groups. If the scores are equal to each other, the division group is classified into the priority scene. For example, in this embodiment, the priority of the daily scene is set as the highest level in an order of daily life>ceremony>trip. Assume that the division group "5" obtained by scene division in 6A of FIG. 6 has a shooting period of 36 hours, the number of shot images of 300, and the average value of the numbers of shot people is 1.7. If a trip scene score is 45.32, a daily scene score is 18.38, and a ceremony scene score is −29.92, the division group "5" is classified into the trip scene.

In step S408, it is determined whether the scene classification in step S407 has ended for all the scenes divided in step S406. If NO in step S407, the process returns to step S407; otherwise, the process advances to step S409.

In step S409, the image scoring module 207 executes main character setting. The main character setting is executed for an image group designated by the user and has two modes, that is, automatic execution and manual execution. If a main character is to be automatically set, the result of personal recognition executed in step S404 and the result of scene division executed in step S406 are used. From the acquired results, a personal ID count of a person appearing in the image group, a personal ID count of each person appearing in each scene, and a scene count by which each personal ID appears can be acquired. A main character is set from these pieces of information. In this embodiment, if a plurality of scenes are present in an image group, the personal ID of a person appearing in a plurality of scenes is set as a main character ID. If an image group has a single scene, a personal ID of a person who has a higher appearance count is set as the main character ID.

If a main character is to be manually set, the personal ID of the main character designation icons 304 designated by the user is output to the image scoring module 207 via the main character information input module 206. If a personal ID designated by the user is present, the automatically set main character ID described above is ignored, and the personal ID designated by the user is set as the main character ID.

In step S410, the image scoring module 207 executes scoring. FIGS. 10A to 10D show a template group used for laying out images. A template 1005 shows one template. A main slot 1002 represents a main slot, and sub-slots 1003 and 1004 represent sub-slots. As characteristic features, the main slot 1002 is a slot (a frame for laying out an image) serving as a main slot in the template 1005 and has a size larger than the sub-slot 1003 or 1004. Scoring is performed by giving both a main slot score and sub-slot score to each image.

FIG. 8A is a table showing information defining, in the main slot and sub-slots, the features of images employed in an album for each scene of trip, daily life, and ceremony. The image scoring module 207 collects, in advance, a plurality of images determined by the user to match the features of the main slot and sub-slot of each scene shown in FIG. 8A. The image scoring module 207 collects the features of the number of faces, face position, and face size of each image, obtains the average value and standard deviation for each slot (main slot and sub-slot) of each scene, and stores the obtained values in the album creation application program. The scene to which each image of the image group designated by the user belongs can be acquired from the result of the scene classification in step S407. A score and an average score are calculated by equations (3) and (4) using the average value and standard deviation obtained in advance in correspondence with the scene of the image of interest and the feature amounts of the main character ID face count, face position, and face size of the image of interest.

$$\text{Score}=50-|10\times(\text{average value}-\text{feature amount})/\text{standard deviation}| \quad (3)$$

$$\text{Average score}=(\text{score of face count}+\text{score of face position}+\text{score of face size})/\text{feature amount item count} \quad (4)$$

Scoring is performed for both the main slot and the sub-slot. Since an image to be used for an album is preferably in focus, a score may be added by a predetermined amount to an image of an image ID whose focus feature amount is "○" shown in FIG. 5.

FIG. 8B shows an example of score results by scoring described above. Scoring is performed for the image IDs of the main slot and sub-slot.

In step S411, it is determined whether image scoring in step S410 has ended for all the images of the image group designated by the user. If NO in step S411, the process returns to step S410; otherwise, the process advances to step S412.

In step S412, the image classification module 205 determines whether the division count of the scene division in step S406 is equal to the double spread count input from the double spread input module 208. If NO in step S412, the process advances to step S413; otherwise, the process advances to step S416. For example, since the scene division count in 6A of FIG. 6 is 8, if the input count of the double spread input module 208 is 8, the process advances to step S416.

In step S413, the image classification module 205 determines whether the division count of the scene division in step S406 is smaller than the double spread count input from the double spread input module 208. If YES in step S413, the process advances to step S415; otherwise, the process advances to step S414. For example, if the scene division count in 6A of FIG. 6 is 8, and the input count of the double spread input module 208 is 10, the process advances to step S414.

In step S414, the image classification module 205 performs sub-scene division for finely dividing the currently divided scenes satisfying "scene division count<double spread count". In this case, a case in which the designated double spread count is 10 for the scene division count "8" of 6A in FIG. 6 will be described as an example. 6B in FIG. 6 indicates the result of sub-scene division performed in 6A of FIG. 6. Divisions are performed at an arrow between 2 and 3 and an arrow between 6 and 7, thereby obtaining the division count "10".

A division criterion will be given as follows. Division groups having larger numbers of images are searched from the respective divisions in 6A of FIG. 6. In order to increase the division count from 8 to 10, two portions having larger numbers of images are decided. First, the division group "5" is decided from the division groups having larger numbers of images. Although the division group "1" has the same number of images as that of the division group "2", the division group "2" is decided as the division target because the division group "2" has a larger time difference from the first image to the last image than that of division group "1".

The division groups "5" and "2" will be divided. First, the division of the division group "2" will be described. The division group "2" has two peaks of the numbers of images. These two peaks have different shooting days. The division group "2" is divided at a portion indicated by a thick arrow in 6B of FIG. 6. Next, the division group "5" has three peaks of the numbers of images which indicate three continuous shooting days. Although two portions where the shooting day changes are available, the division is performed to minimize the image count difference after the division. Therefore, the division group "5" is divided at a portion indicated by a thick arrow in 6B of FIG. 6.

As described above, the division count is changed from 8 to 10. In the above description, the division groups are divided at different shooting days. However, if a portion at which the number of images is large falls within a single day, the division is made at a portion having the maximum time difference in a day.

In step S415, the image classification module 205 performs scene integration for integrating the currently divided scenes satisfying "scene division count>double spread count". In this case, a case in which the scene division count in 6A of FIG. 6 is 8, and the designated double spread count is 6 will be described as an example. 6C in FIG. 6 indicates the result of scene integration performed in 6A of FIG. 6. Portions between broken lines are integrated to obtain the division count of 6.

An integration criterion will be given as follows. Division groups having small numbers of images are searched from all the division groups in 6A of FIG. 6. In this case, in order to reduce the division count from 8 to 6, two portions having small numbers of images are decided. First, the division group "8" is decided from the division groups having smaller numbers of images. Next, although the number of images of the division group "3" is equal to that of the division group "7", the division group "3" is decided as the integration target because the division group "8" adjacent to the division group "7" is already the integration target.

The division groups "8" and "3" are integrated independently. First, the integration of the division group "3" will be described below. The time difference between the division group "3" and the division group "2" is compared with the time difference between the division group "3" and the division group "4". Since the time difference between the division group "3" and the division group "4" is smaller, the division group "3" is integrated with the division group "4". They are integrated at the broken line in 6C of FIG. 6. Next, since the division group "8" does not have any succeeding division group, the division group "8" is integrated with the immediately preceding division group "7". Therefore, the integration is performed at the portion indicated by the broken line in 6C of FIG. 6.

In step S416, the double spread assignment module 209 executes double spread assignment. By steps S412 to S415, the scene division count is set equal to the designated double spread count. The first shooting date/time division is assigned first, and subsequent division groups are assigned sequentially in the succeeding double spreads.

In step S417, the image selection module 210 selects images. In this case, a case in which four images are selected from a division group assigned to a certain double spread will be described as an example with reference to FIG. 9.

Figure 9:
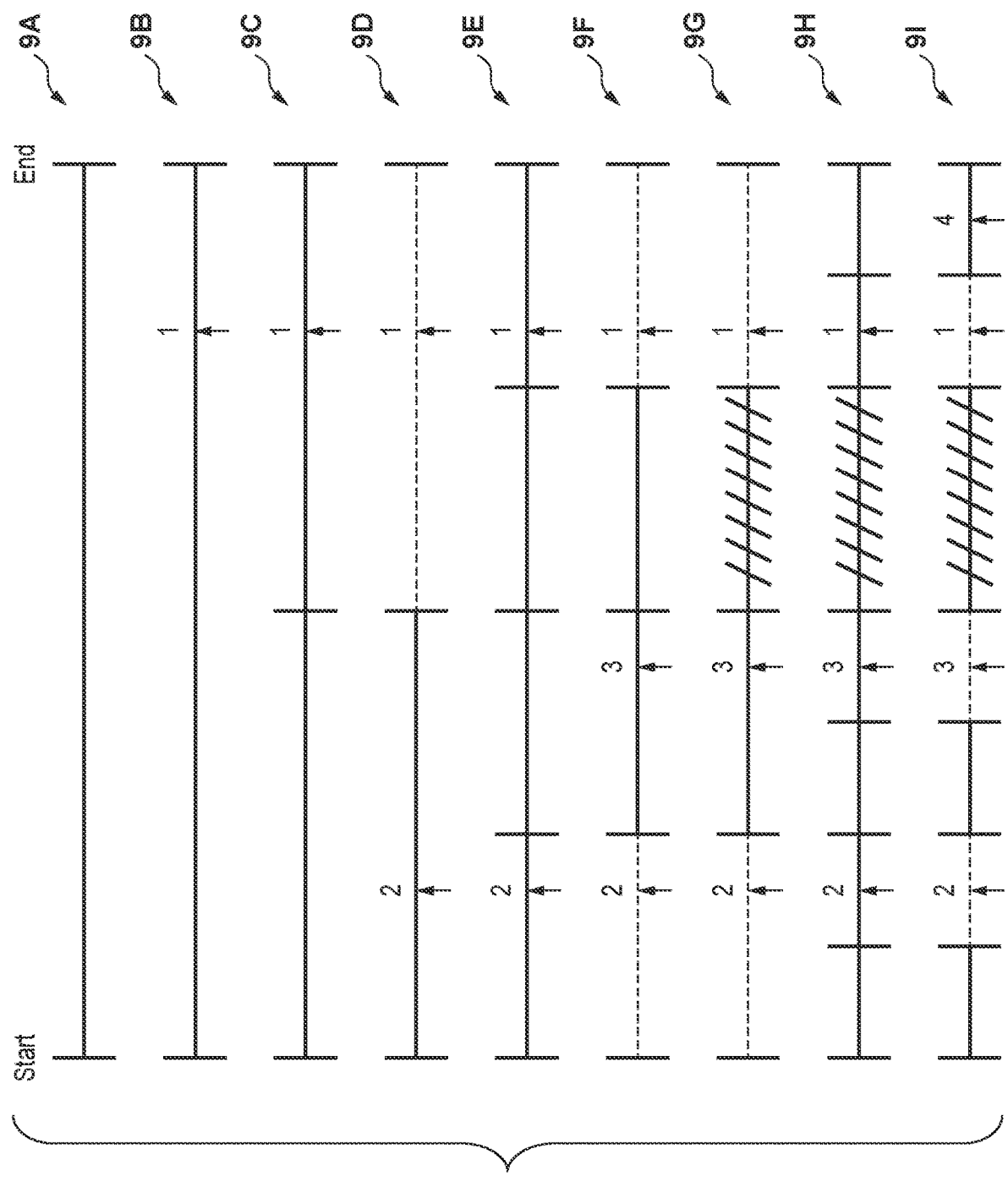
FIG. 9 is a view for explaining image selection from a division group.

9A in FIG. 9 indicates a time difference (division shooting period) from the first image to the last image in the shooting date/time of the division group assigned to the double spread. A method of selecting the first image will be described with reference to 9B in FIG. 9. A template has one main slot 1002. The first image is selected as the main slot image. An image whose main slot score given in step S410 is the highest point is selected from images corresponding to the division shooting period shown in 9B of FIG. 9. Second and subsequent images are selected as sub-slot images.

Image selection is performed to subdivide the division shooting period so as not to concentrate image selection in part of the division shooting period. First, as shown in 9C of FIG. 9, the division shooting period is divided into two. As shown in 9D of FIG. 9, the second image is selected from the division shooting period, indicated by a solid line, from which the first image is not selected. An image whose sub-slot score has the highest point is selected from the images corresponding to the division shooting period indicated by the solid line. Next, as shown in 9E of FIG. 9, each division shooting period in 9D of FIG. 9 is divided into two. As shown in 9F of FIG. 9, an image whose sub-slot score has the highest point is selected as the third image from the images corresponding to the division shooting periods, indicated by the solid lines, from which the first and second images are not selected.

Next, an example in which no image is present in a division shooting period for selecting an image, and no image selection can be performed will be described using selection of a fourth image. As shown in 9G of FIG. 9, even if the user wants to select the fourth image from a hatched division shooting period from which no image is selected, no image is present in this hatched division shooting period. As shown in 9H of FIG. 9, each division shooting period is divided into two. Next, as shown in 9I of FIG. 9, an image whose sub-slot score has the highest point is selected as the fourth image from the images corresponding to the division shooting periods, indicated by the solid lines, from which the first to third images are not selected.

Figure 10:
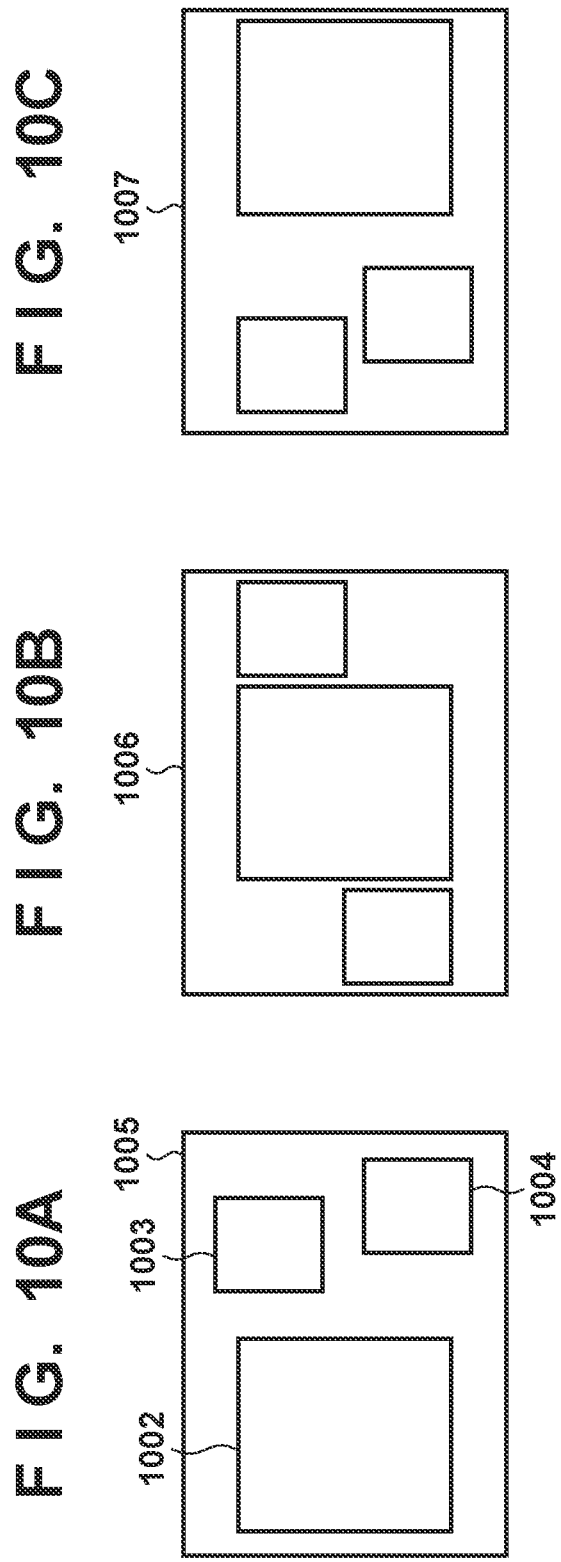
FIGS. 10A to 10D are views showing the templates used for image layout.

In step S418, the image layout module 212 decides an image layout. A case in which the template input module 211 inputs the template 1005 and templates 1006 and 1007 shown in FIGS. 10A to 10C to a certain double spread in accordance with the designated template information will be described below. The number of slots of each of the input templates is 3. Assume that the three selected images which are arranged in the order of shooting date/time are given as shown in FIG. 10B. In this case, a slot 1010 is the main slot, and slots 1008 and 1009 are sub-slots. In this embodiment, an image having an older shooting date/time is laid out at the upper left position, while an image having a newer shooting date/time is laid out at the lower right position. Since the main slot image 1010 has the newest shooting date/time, the layout is decided such that the template 1007 is a template most suitable for the selected image. In step S418, information capable of identifying the correspondence between an image, a template, and a slot is decided.

In step S419, the image correction module 214 executes image correction. If an image correction ON instruction is input from the image correction condition input module 213, image correction is executed. In this embodiment, as image correction, for example, dodging correction (luminance correction), red-eye correction, and contrast correction are performed. On the other hand, if an image correction OFF instruction is input from the image correction condition input module 213, no image correction is executed. For example, image correction ON/OFF mode is set for an image converted into an sRGB color space and having 1,200 pixels along the short side as the number of pixels of an image to be corrected.

In step S420, the layout information output module 215 performs the creation of the layout information. The layout information output module 215 lays out an image processed in step S419 into each slot of each template decided in step S418. At this time, the layout information output module 215 scales an image according to the slot size information and lays it out in the slot. The layout information output module 215 also generates bit map data in which an image is laid out in a template.

In step S421, it is determined whether all the processes in steps S417 to S420 have ended for all the double spreads. If NO in step S421, the process returns to step S417; otherwise, processing in FIGS. 4A and 4B ends.

Trimming performed at the time of scaling and laying out an image will be described in detail. Trimming processing is executed for an image assigned to each slot of each template decided in step S418.

Figure 11:
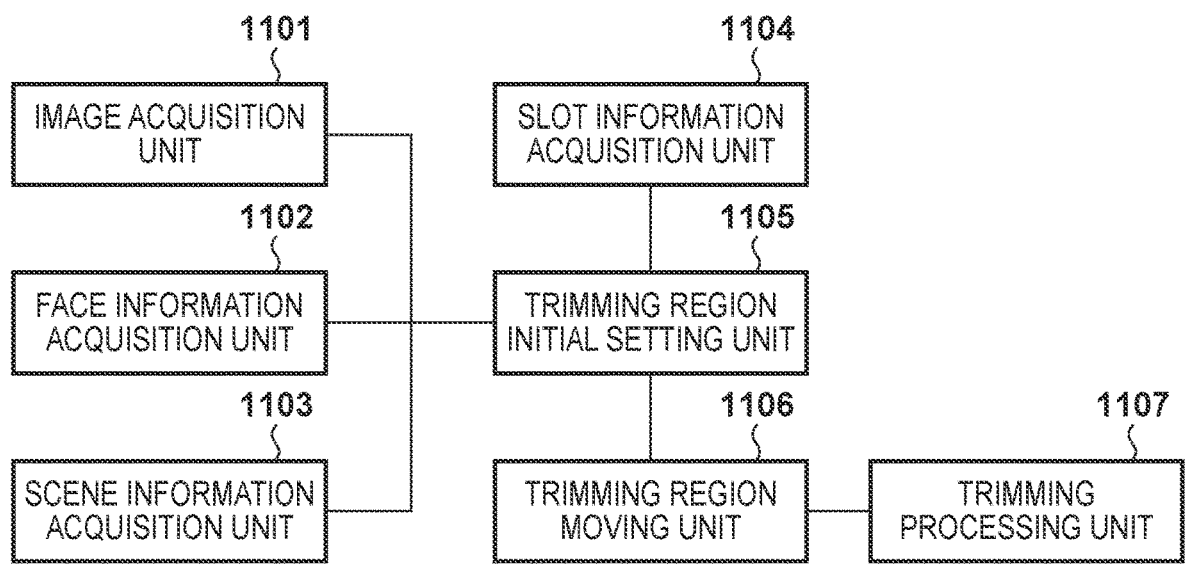
FIG. 11 is a block diagram concerning trimming control.

FIG. 11 is a block diagram concerning trimming control. Each block in FIG. 11 is arranged in the layout information output module 215 shown in FIG. 2. A case in which the image 1010 is laid out in a slot of the selected template 1007 in FIGS. 10C and 10D will be described below.

An image acquisition unit 1101 acquires the image 1005. A face information acquisition unit 1102 acquires the result of face detection executed by the image analysis module 204 for the image 1005. The acquired face detection result includes the number of faces, face sizes (widths and heights), face position information and ID information obtained upon personal recognition.

A scene information acquisition unit 1103 acquires the result of scene determination executed by the image classification module 205 for the image 1005. A slot information acquisition unit 1104 acquires information of a slot in which the image is arranged in the template decided in step S418. The acquired slot information includes the width and height of the slot.

A trimming region initial setting unit 1105 sets the interim position of the image trimming region based on the acquired slot information. The trimming region interim position will be described later in detail with reference to FIG. 12. The trimming region initial setting unit 1105 calculates a scaling factor of the image based on the slot information, that is, the trimming region and scales the image in accordance with the calculated scaling factor.

Figure 12:
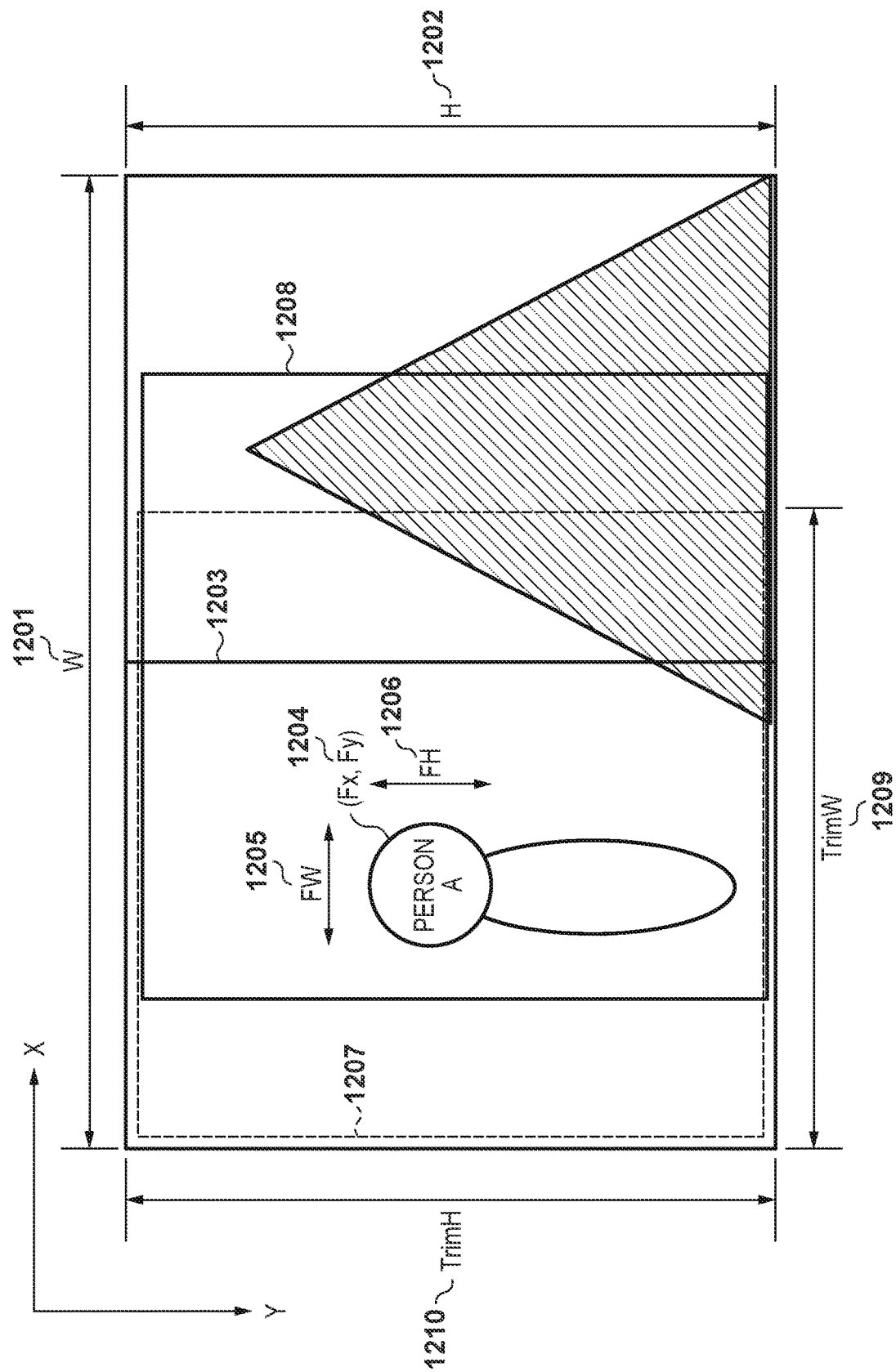
FIG. 12 is a view for explaining setting of a trimming region.

FIG. 12 is a view for explaining trimming region setting. A width 1201 represents the width of the scaled image, and a height 1202 represents the height of the scaled image. The central axis 1203 represents the central axis of the image.

In place of the calculation of the image scaling factor based on the trimming region, the size of the trimming region may be changed in accordance with a scene, and an image may be scaled using the changed trimming region size. For example, for a trip scene, the trimming region is set smaller than the slot region, and an image is scaled using the size of the reduced trimming region. By performing trimming using the trimming region before the change, the scaling factor is lowered to facilitate trimming of a person together with scenery. For a daily life scene, the trimming region is set larger than the slot region, and an image is scaled using the increased trimming region. By performing trimming using the trimming region before the change, the scaling factor is increased to facilitate trimming of a person as a main character.

A width 1209 indicates the width of an initial trimming region 1207, and a height 1210 indicates the height of the initial trimming region 1207. In this case, the trimming region is a square region having the width and height equal to each other. The initial trimming region 1207 indicates the interim trimming region initial setting as the default setting. In the initial setting, a face region included in an image to be laid out is considered. That is, the position of the initial trimming region 1207 is set such that the center coordinates of the face of a person A in FIG. 12 are given as the center coordinates of the initial trimming region 1207.

In this case, a case in which only one person is shot in an image will be described as an example. Center coordinates 1204 indicate the center coordinates (Fx,Fy) of the detected face. A face width 1205 indicates the width of the detected face, and a face height 1206 indicates the height of the detected face. In this case, the face width 1205 is equal to the face height 1206. The center coordinates 1204, the face width 1205, and the face height 1206 have values changed to match the image whose scaling factor has been changed.

The initial trimming region 1207 is laid out so that the center position of the initial trimming region 1207 overlaps the center coordinates 1204 of the detected face. With this layout, if the initial trimming region 1207 extends outside the image region, the position of the initial trimming region 1207 is adjusted such that a distance between the center coordinates 1204 of the face and the central position of the trimming region is minimized so as not to extend outside the image region.

A trimming region moving unit 1106 in FIG. 11 moves, by a moving amount corresponding to the determined scene classification result, the initial trimming region 1207 set by the trimming region initial setting unit 1105. The results (for example, trip, daily life, and wedding ceremony) of scene classifications obtained by the image classification module 205 are input to the trimming region moving unit 1106. In general, a trip scene often has a case in which a person is shot together with the visited scenery or building. For this reason, trip scene shooting often has a composition in which a long shot image is obtained while a person is laid out at a position away from the center of the image. When trimming is performed centered on the face by the initial trimming region 1207 described with reference to FIG. 12, the scenery and building shot together with the person are greatly cut. As a result, album creation reflecting the user's intention cannot be performed, thus not attaining the user's satisfaction.

On the other hand, a daily life scene often has a case in which a person is the main object. For this reason, even if trimming is performed centered on the face by the initial trimming region 1207, trimming can be performed without any discomfort of the user. For another scene such as a wedding ceremony scene, trimming is performed to have a composition classified between the trip scene and the daily life scene. In this embodiment, as described above, the initial trimming region 1207 is moved in consideration of the shooting scene. As a result, album creation reflecting the user's intention can be performed.

Processing for moving the initial trimming region 1207 in accordance with a shooting scene will be described below. In this processing, the initial trimming region 1207 in FIG. 12 is moved toward a central axis 1203. First, two-fold sizes of the detected face width 1205 and the detected face height 1206 are set for the center coordinates 1204 of the face. The region having the changed sizes is defined as a face cut determination region. In this case, the face cut determination region is set in a constant multiple of the face size but the size can be changed in accordance with a scene. For example, for a trip scene, the face cut determination region is set small in order to include scenery other than the face. For other scenes, the face cut determination region may be set large.

Next, a distance d from the initial trimming region 1207 to the face cut determination region is calculated. In FIG. 12, the distance d is calculated by:

$$d = Fx - 2 \times (FW/2) \quad (5)$$

Although only the horizontal movement is described in FIG. 12, the distance d can be calculated even for the vertical movement. A moving amount in consideration of a scene is calculated by equation (6) for the calculated distance d:

$$ds = d \times \text{Rate\_s} \quad (6)$$

where Rate_s is a moving amount weight set from a scene. The moving amount weight is set large for the trip scene, and small for any other scenes. For example, the moving amount weight for the trip scene is set as 0.8, the moving amount weight for the daily life scene is set as 0, and the moving amount weight for any other scene is set as 0.4. In addition, individual weights may be set for scenes other than the trip scene. If a reliability degree is calculated in scene determination, the moving amount ds may be adjusted in accordance with the reliability degree. For example, if the reliability degree is high, the calculated moving amount ds is used without any change. If the reliability degree is low, a bias is applied to the moving amount ds to reduce the moving amount. By using a moving amount calculated by the above procedure, a trimming region 1208 moved by ds from the initial trimming region 1207 is decided as the final trimming region.

A trimming processing unit 1107 trims the image based on the trimming region moved by the trimming region moving unit 1106.

Figure 13:
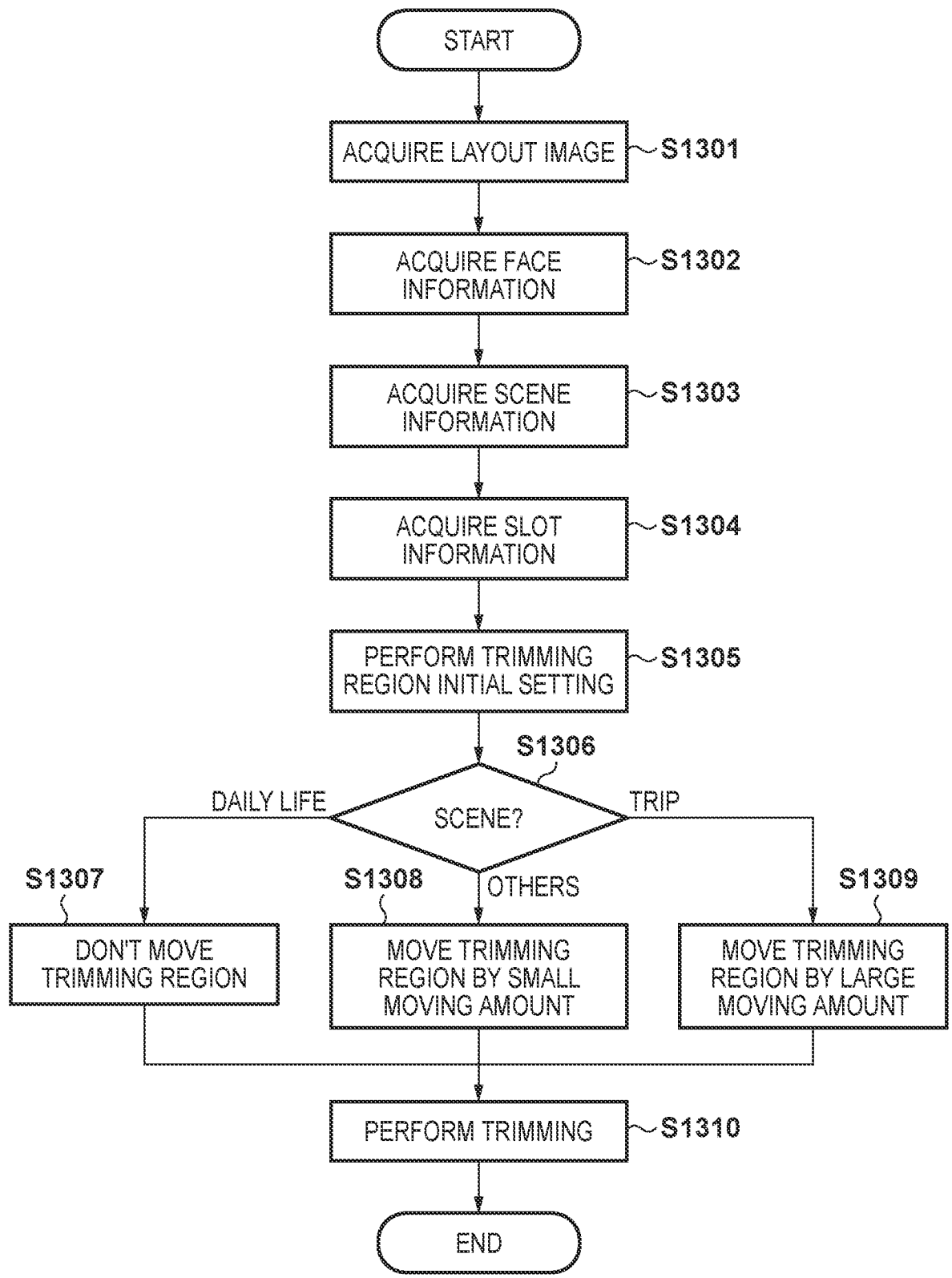
FIG. 13 is a flowchart showing trimming processing.

FIG. 13 is a flowchart showing trimming processing. The processing in FIG. 13 is performed in step S420 in FIG. 4B. In step S1301, the image acquisition unit 1101 acquires an image to be trimmed and laid out in a designated slot in the selected template. In step S1302, the face information acquisition unit 1102 acquires face image included in the image to be laid out.

In step S1303, the scene information acquisition unit 1103 acquires the determination result of the type of scene concerning the image to be laid out. More specifically, the type of scene decided in step S407 is acquired for the image group (scene) including the image. In step S1304, the slot information acquisition unit 1104 acquires the information of a slot in which the image is laid out in the selected template.

In step S1305, the trimming region initial setting unit 1105 scales the image to be laid out and the face information based on the slot information. The trimming region initial setting unit 1105 sets the interim initial trimming region 1207 so that the face position in the image to be laid out matches the center of the trimming region (slot information). The trimming region initial setting unit 1105 calculates the distance d between the initial trimming region 1207 and the face cut determination region.

In step S1306, the trimming region moving unit 1106 changes the moving amount of the initial trimming region 1207 in accordance with the scene type determination result acquired in step S1303. In this case, the moving amount of the initial trimming region 1207 is changed in accordance with a trip scene, a daily life scene, or any other scene.

If the scene is determined as a daily life scene in accordance with the scene determination result, the weight Rate_s, for example, 0 is set for the distance d between the trimming region and the face cut determination region in step S1307, and the moving amount ds is calculated. In this case, since the weight Rate_s is 0, the moving amount ds is 0. The initial trimming region 1207 is moved based on the moving amount ds, thereby setting the final trimming region.

If the scene is determined as any other scene in accordance with the scene determination result, the weight Rate_s, for example, 0.4 is set for the distance between the trimming region and the face cut determination region in step S1307, and the moving amount ds is calculated. The initial trimming region 1207 is moved based on the moving amount ds, thereby setting the final trimming region.

If the scene is determined as a trip scene in accordance with the scene determination result, the weight Rate_s, for example, 0.8 is set for the distance d between the trimming region and the face cut determination region in step S1307, and the moving amount ds is calculated. The initial trimming region 1207 is moved based on the moving amount ds, thereby setting the final trimming region.

In step S1310, the trimming processing unit 1107 trims the image based on the set trimming region.

In this embodiment, the processing for setting the trimming region in accordance with the scene classification result performed by the main character information input module 206 has been described above. However, for scene setting, a scene may be set by another method. For example, a scene may be manually set on the UI by the user. Alternatively, scene information may be associated with a template, and a scene may be set from the template selected by the user. By any method, the initial trimming region 1207 is moved by the moving amount ds in accordance with the set scene, thereby setting the final trimming region. As a result, the album creation reflecting the user's intention can be performed.

Second Embodiment

The second embodiment will describe a trimming method when a plurality of faces are included in an image. Points different from the first embodiment will be described below.

Figure 14:
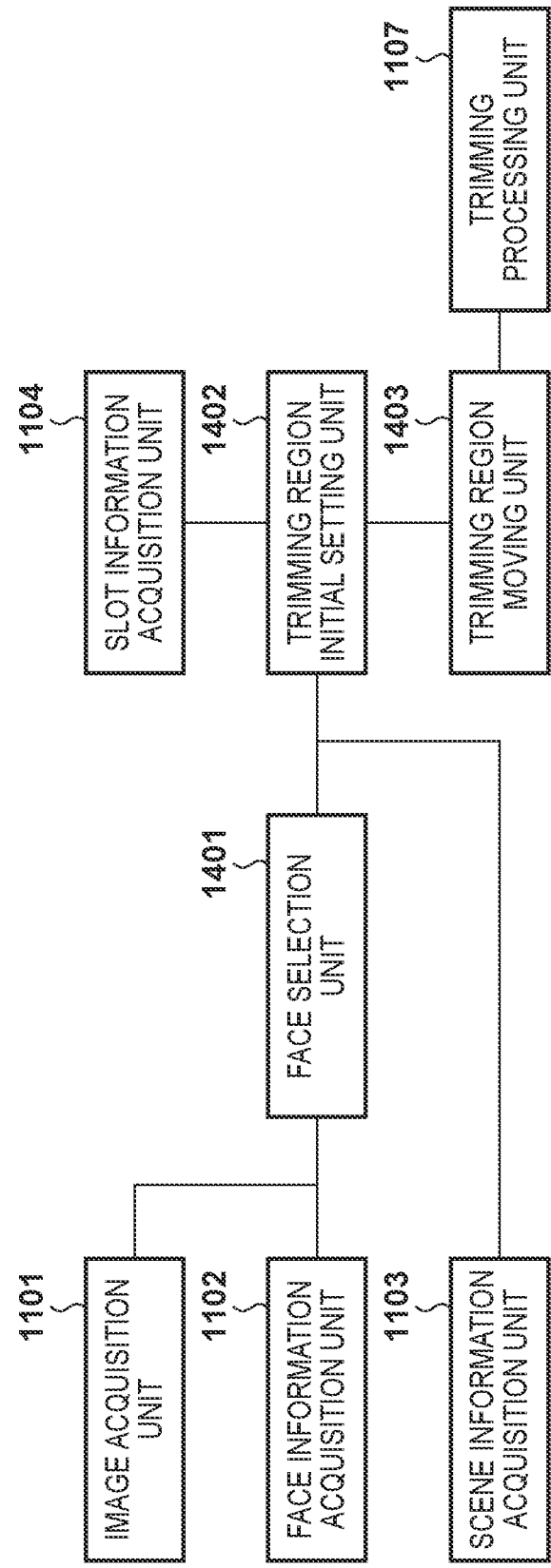
FIG. 14 is a block diagram concerning trimming control.

FIG. 14 is a block diagram concerning trimming control. A description of an image acquisition unit 1101, a face information acquisition unit 1102, a scene information acquisition unit 1103, a slot information acquisition unit 1104, and a trimming processing unit 1107 is the same as in FIG. 11, and a detailed description will be omitted. A face selection unit 1401 selects faces included in the trimming region based on the acquired face information using the number of faces acquired by the face information acquisition unit 1102, the size of each face, the position information of each face, and the ID information of each face.

Figure 15:
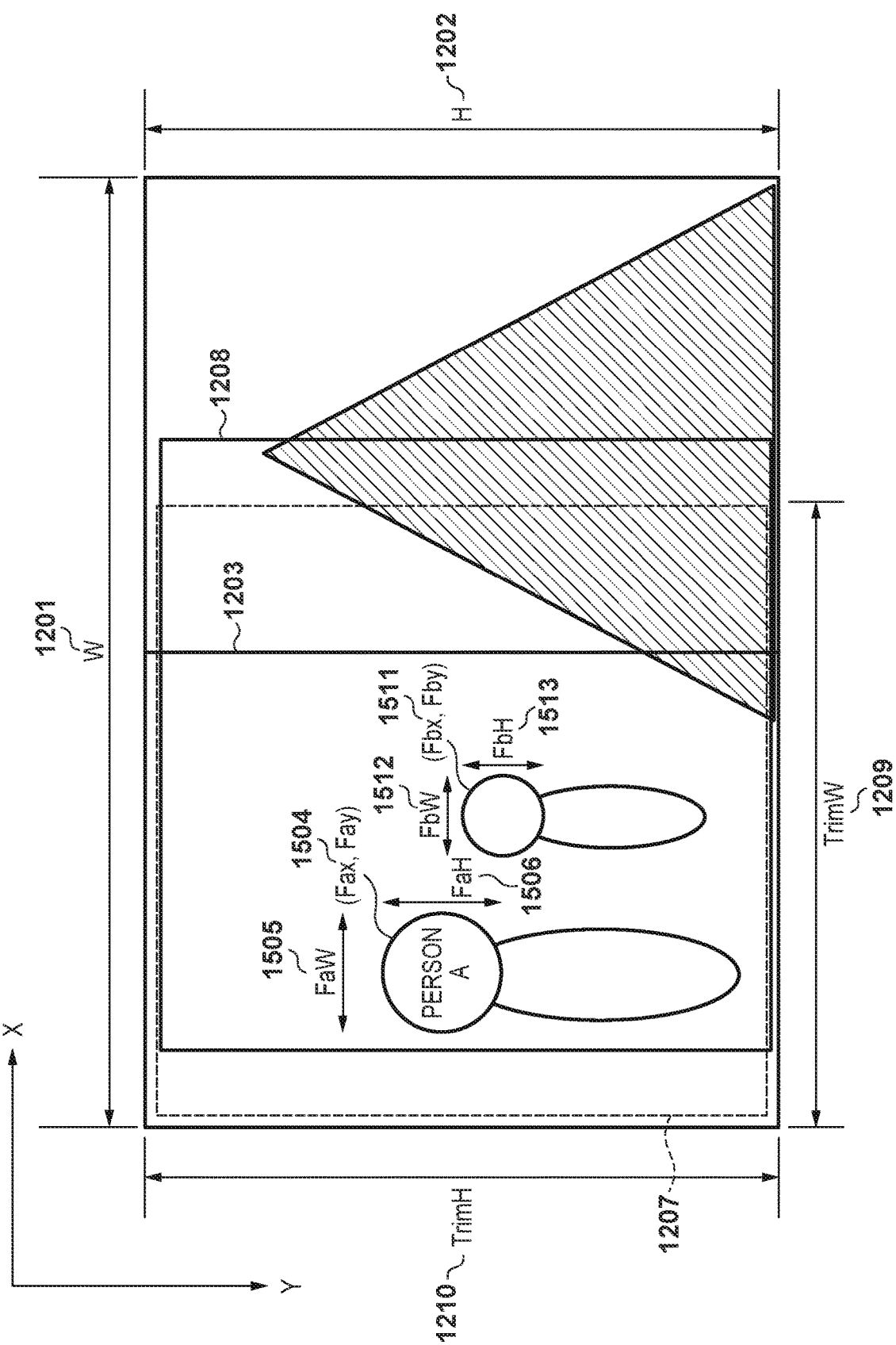
FIG. 15 is a view for explaining processing for selecting a face.

FIG. 15 is a view for explaining processing for selecting faces by the face selection unit 1401. For the descriptive convenience, a case in which two faces are detected will be described as an example. A region in which the faces are distributed is determined from the center coordinates of the detected faces. The distributions are grouped by determining whether the distributions are located on the left or right side with respect to a central axis 1203 of the image. The groups may be further classified more in detail. In FIG. 15, the faces are located on the left side of the image, these faces are determined as one group. In this embodiment, the face selection unit 1401 further performs face selection for setting the trimming region for the determined group. If a plurality of groups are determined, a group having a larger number of faces included in the group may be selected as a face selection target. Alternatively, a group which undergoes face selection may be decided in accordance with whether the face of the main character set by a main character information input module 206 is included.

As shown in FIG. 15, the faces of two persons A and B are included. Center coordinates 1504 represent face center coordinates (Fax,Fay) detected for the person A, a face width 1505 represents the face width of the person A, and a face height represents the face height of the person A. Center coordinates 1511 represent face center coordinates (Fbx, Fby) detected for the person B, a face width 1512 represents the face width of the person B, and a face height 1513 represents the face height of the person B.

Next, the shortest distances from the center coordinates 1504 and 1511 of the persons A and B to the center axis 1203 of the image are calculated, and the person having a longer distance is selected. In the case of FIG. 15, the face of the person A is selected. The setting (to be described later) of the initial trimming region 1207 is performed for the selected face.

In this embodiment, the face having a longer distance from the central axis 1203 is selected in the group, but a face may be selected by any other method. For example, a face having a larger size may be selected, or a face set as a main character may be selected. Alternatively, the selection method may be changed in accordance with a scene. For example, for a trip scene, a smaller face may be selected. For a daily life scene, a larger face may be selected.

A trimming region initial setting unit 1402 in FIG. 14 sets the interim position of an initial trimming region 1207 based on the face selected by the face selection unit 1401 and the slot information acquired by the slot information acquisition unit 1104.

When the face of the person A is selected in FIG. 15, the trimming region initial setting unit 1402 lays out the initial trimming region 1207 so that the center position of the initial trimming region 1207 overlaps the face center coordinates of the selected person A. With this layout, if the initial trimming region 1207 extends outside the image region, the position of the initial trimming region 1207 is adjusted such that a distance between the center coordinates 1504 of the face and the central position of the trimming region 1207 is minimized so as to extend outside the image region.

In accordance with the determined scene classification result, a trimming region moving unit 1403 moves the initial trimming region 1207 set by the trimming region initial setting unit 1402. The two-fold sizes of the face width 1505 and a face height 1506 of the person A are set as the face cut determination region for the center coordinates 1504. After that, the moving amount of the initial trimming region 1207 is controlled by the trimming processing unit 1107.

Figure 16:
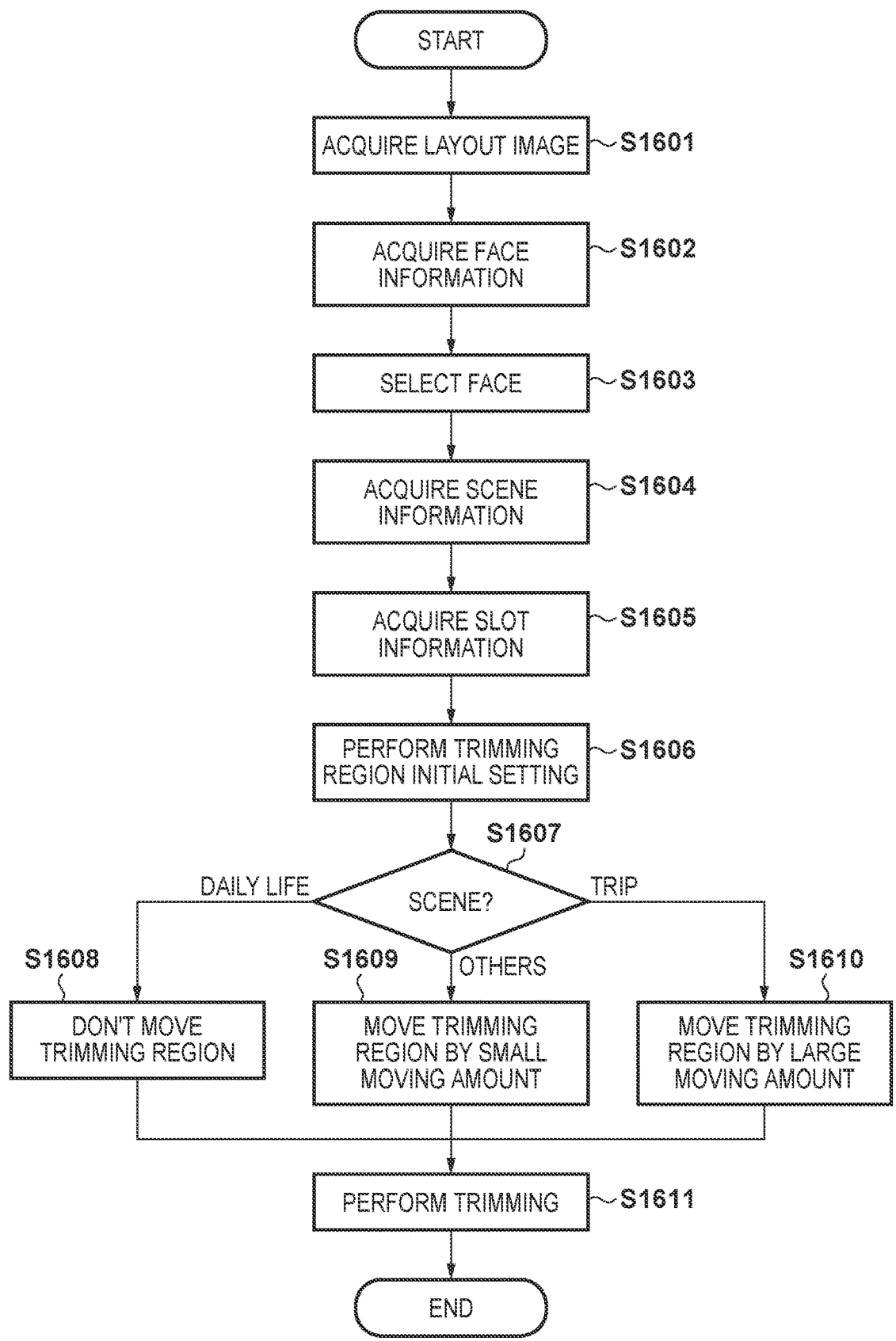
FIG. 16 is a flowchart showing trimming processing.

FIG. 16 is a flowchart showing trimming processing in this embodiment. A description of steps S1601 and S1602 is the same as in steps S1301 and S1302, and a detailed description will be omitted. In step S1603, the face selection unit 1401 selects the face used in the setting of the initial trimming region 1207 based on the face information included in the image to be trimmed.

A description of steps S1604 and S1605 is the same as in steps S1303 and S1304, and a detailed description will be omitted. In step S1606, the trimming region initial setting unit 1402 scales the image to be laid out and the face information based on the slot information acquired in step S1605. The trimming region initial setting unit 1402 sets the interim initial trimming region 1207 based on the face selected in step S1603 and calculates the distance d between the initial trimming region 1207 and the face cut determination region. A description of steps S1607 to S1611 is the same as in steps S1306 to S1310, and a detailed description will be omitted.

As has been described above, according to this embodiment, a face satisfying a predetermined condition can be selected even if a plurality of images are included in the image, the initial trimming region 1207 can be set based on the selected face, and the final trimming region can be set. As a result, album creation reflecting the user's intention can be performed.

Third Embodiment

The third embodiment will describe a method of moving the center position of an initial trimming region 1207 in accordance with a scene and then setting the final trimming region. Points different from the first and second embodiments will be described below.

Figure 17:
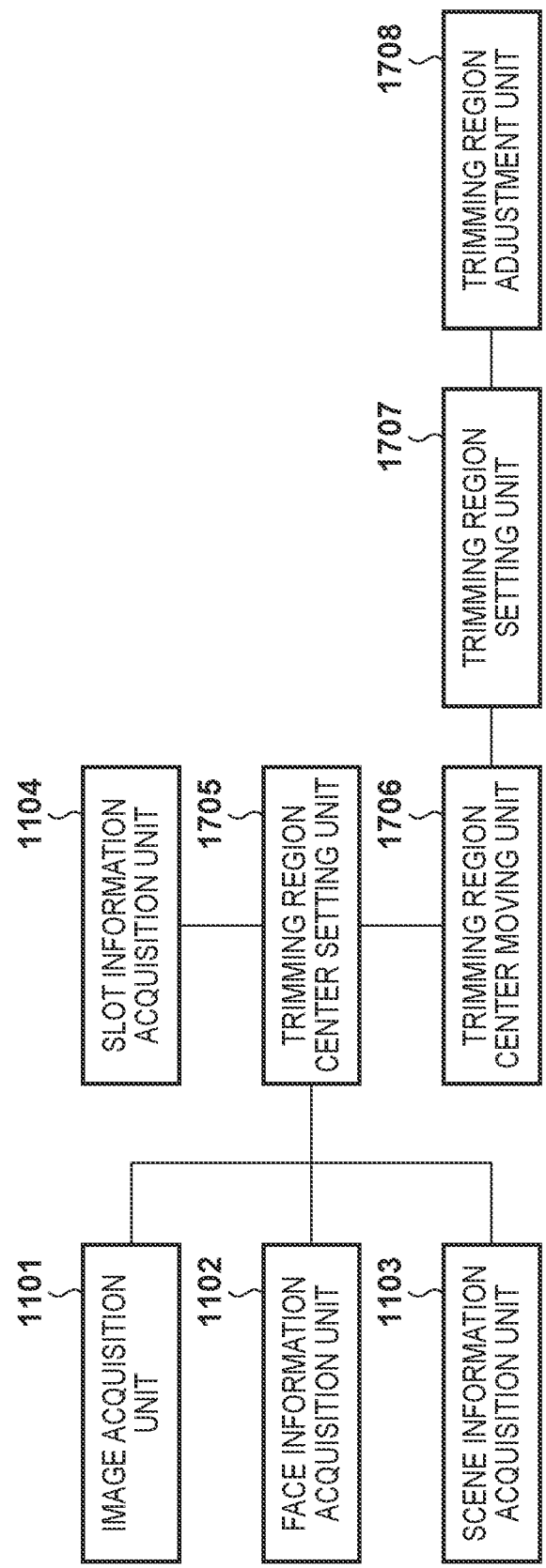
FIG. 17 is a block diagram concerning trimming control.

FIG. 17 is a block diagram concerning trimming control. A description of an image acquisition unit 1101, a face information acquisition unit 1102, a scene information acquisition unit 1103, and a slot information acquisition unit 1104 is the same as in FIG. 11, and a detailed description will be omitted.

A trimming region center setting unit 1705 sets the center position of a trimming region based on the face information acquired by the face information acquisition unit 1102. In this case, a case including one face in an image region will be described below.

Figure 18:
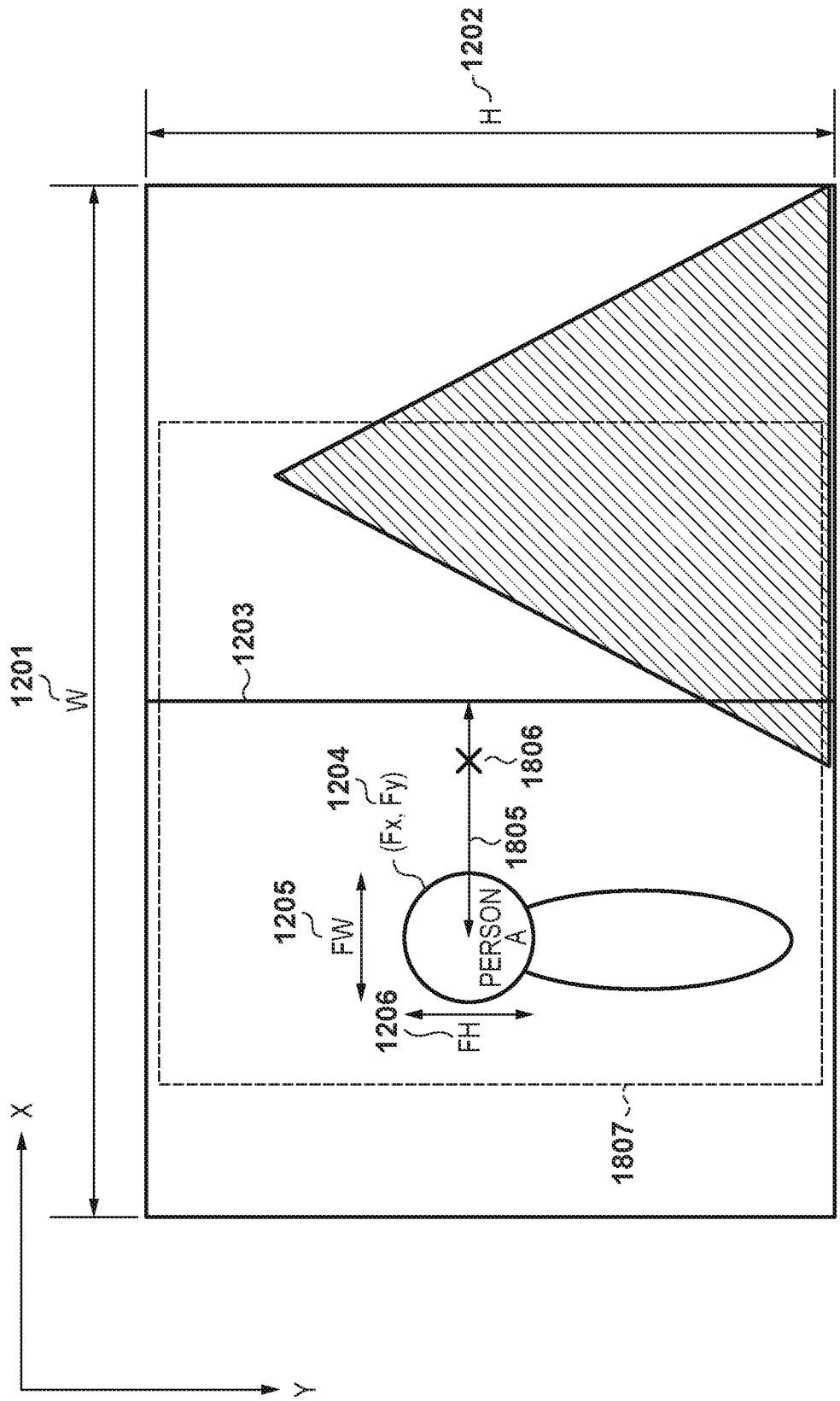
FIG. 18 is a view for explaining setting of a trimming region.

FIG. 18 is a view for explaining a method of setting the trimming region by the trimming region center setting unit 1705. Center coordinates 1204 of the face are acquired as the reference point from the face information acquired by the face information acquisition unit 1102. In this case, a distance 1805 represents a distance from the center coordinates 1204 of the face to a central axis 1203 having the same height as that of the face center. A center 1806 represents the center of the trimming region after the reference point is moved in accordance with a scene.

In this embodiment, a distance D represented by the distance 1805 is changed in accordance with a scene determination result. A distance Ds corresponding to the scene is calculated by:

$$Ds = D \times Rate\_s \quad (7)$$

where Rate_s is the weight corresponding to the scene. For example, the weight is 0.8 for a trip scene, 0 for a daily life scene, and 0.4 for any other scene. A position spaced apart from the center coordinates 1204 of the face by the distance Ds calculated by equation (7) on the line connecting the center coordinates 1204 of the face and the central axis 1203 is set as the center 1806 of the trimming region after the movement. For example, for a daily life scene, since Rate_s=0, the distance Ds becomes 0. The center 1806 of the trimming region after the movement is kept as the center coordinates 1204 of the face.

A trimming region center moving unit 1706 in FIG. 17 moves the reference point by the distance Ds.

A trimming region setting unit 1707 sets the trimming region based on the center of the trimming region after movement by the trimming region center moving unit 1706. The trimming region setting unit 1707 sets the trimming region to match the short side of the image scaled based on the slot information acquired by the slot information acquisition unit 1104. In FIG. 18, the short side of the image is the height 1202, and the trimming region setting unit 1707 sets a rectangular trimming region to match a height 1202. At this time, the trimming region is set so that the center of the trimming region overlaps the center 1806 of the trimming region after the movement. A trimming region 1807 is a trimming region set by the trimming region setting unit 1707.

Figure 19:
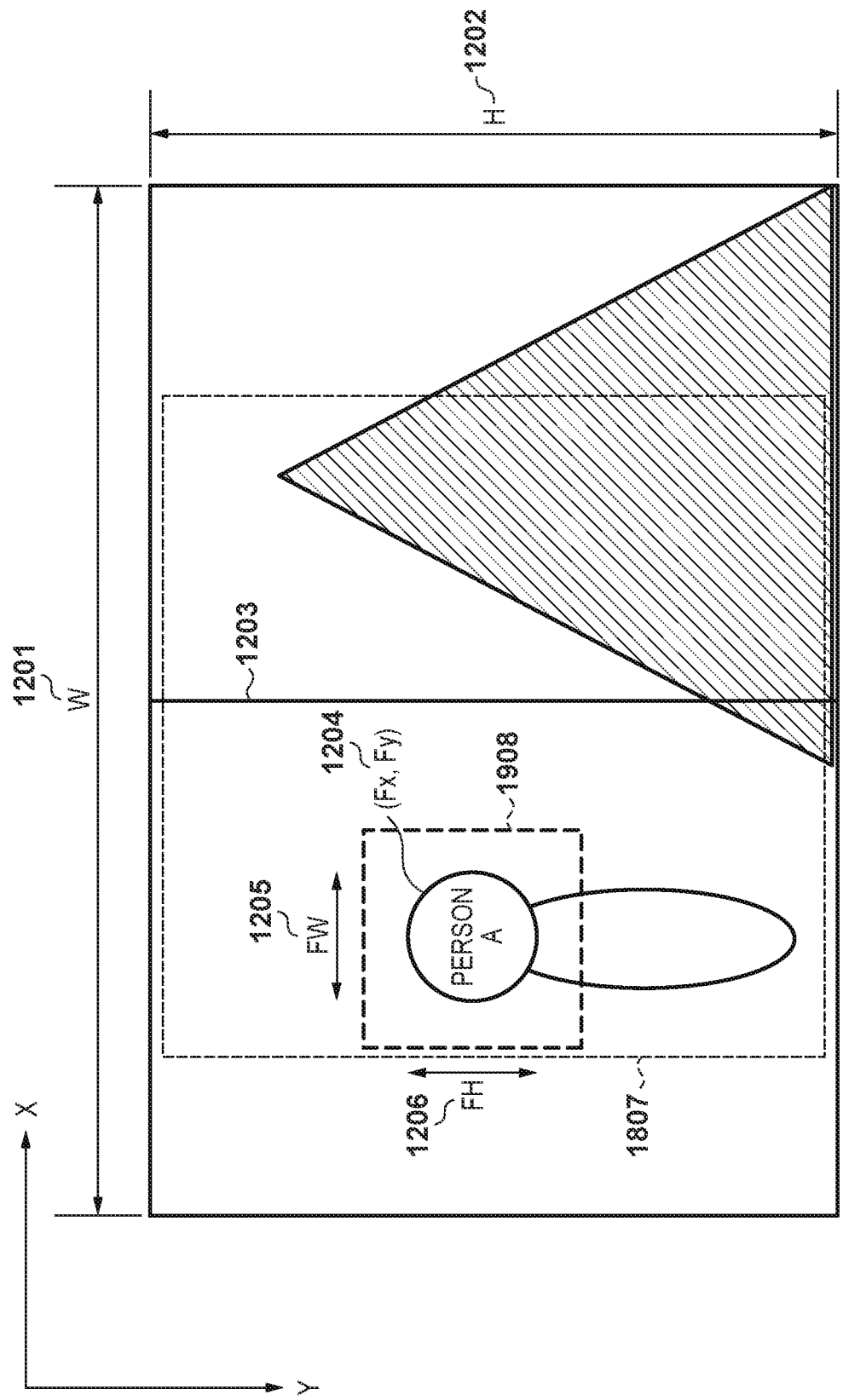
FIG. 19 is a view showing a face cut determination region.

The operation of a trimming region adjustment unit 1708 will be described below. As described above, the face region may be cut when the trimming region setting unit 1707 sets the trimming region. For this reason, as shown in FIG. 19, the trimming region adjustment unit 1708 sets a face cut determination region 1908 based on the detected face size. In this case, the face cut determination region 1908 sets the two-fold sizes of a detected face width 1205 and a detected face height 1206. The trimming region adjustment unit 1708 determines whether the face cut determination region 1908 falls within the trimming region. If it is determined that the region 1908 does not fall within the trimming region, that is, if it is determined that the face cut has occurred, the following processing is executed.

If it is determined that the face cut has occurred in FIG. 19, the trimming region is set near the center of the image. For this reason, the position of the trimming region is adjusted such that the given end side most spaced apart from the central axis 1203 in the face cut determination region 1908 overlaps the end side of the trimming region which is located from the given end side by the shortest distance. As a result, the state can be set as a state in which the face cut determination region 1908 falls within the trimming region, that is, the face cut does not occur.

The above description has exemplified the case in which only one face is included in the image. However, the image may include a plurality of faces. In this case, a face may be selected by the processing described with reference to the second embodiment. That is, a face farthest from the central axis 1203 may be set as the reference point. Alternatively, the barycentric position of a plurality of faces may be calculated and set as the reference position. In addition, a face designated as a main character in a plurality of faces may be set as the reference point. By any method, the reference point is moved by the distance corresponding to the scene, and the trimming region is set centered on the point after movement.

Figure 20:
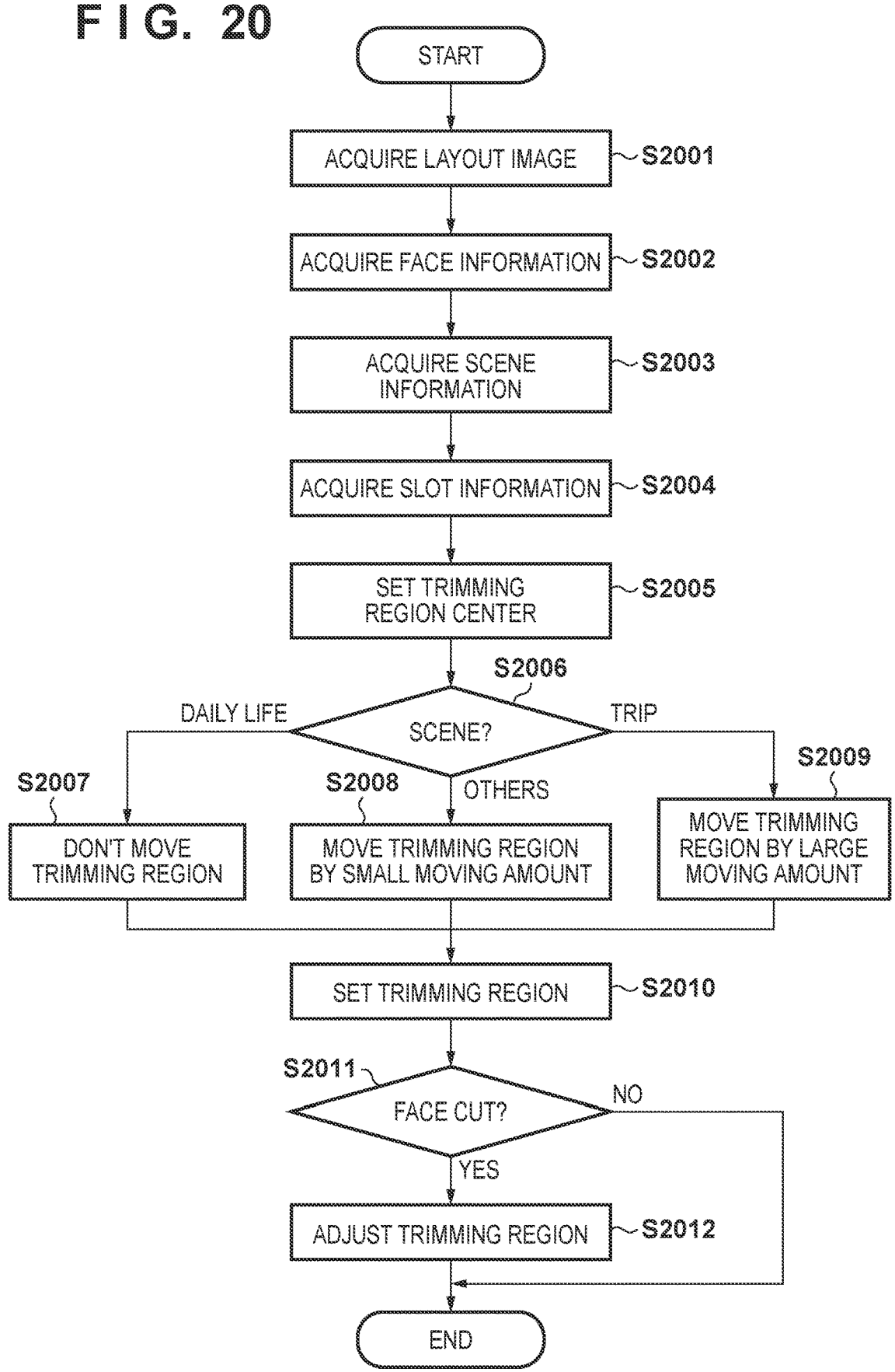
FIG. 20 is a flowchart showing trimming processing.

FIG. 20 is a flowchart showing trimming processing according to this embodiment. A description of steps S2001 to S2004 is the same as in steps S1301 to S1304, and a detailed description will be omitted. In step S2005, the trimming region center setting unit 1705 sets a reference point from the acquired face information. In step S2006, the trimming region center moving unit 1706 changes processing in accordance with the acquired scene determination result. In this case, the processing is changed in accordance with a trip scene, daily life scene, or any other scene.

If the scene is determined as a daily life scene, in step S2007 the trimming region center moving unit 1706 sets the weight Rate_s, for example, 0 for the distance D from the center coordinates 1204 of the face to the central axis 1203 and calculates the moving amount Ds by equation (7). The trimming region center moving unit 1706 sets the center of the trimming region after the movement at a position spaced apart from the center coordinates 1204 of the face by the distance Ds.

If the state is determined as any other scene, in step S2008 the trimming region center moving unit 1706 sets the weight Rate_s, for example, 0.4 for the distance D and calculates the moving amount Ds by equation (7). The trimming region center moving unit 1706 sets the center of the trimming region after the movement at a position spaced apart from the center coordinates 1204 of the face by the distance Ds.

If the state is determined as a trip scene, in step S2009 the trimming region center moving unit 1706 sets the weight Rate_s, for example, 0.8 for the distance D and calculates the moving amount Ds by equation (7). The trimming region center moving unit 1706 sets the center of the trimming region after the movement at a position spaced apart from the center coordinates 1204 of the face by the distance Ds.

In step S2010, the trimming region setting unit 1707 decides the trimming region size matching the short side of the image based on the slot information acquired in step S2004. The trimming region setting unit 1707 sets the trimming region so that the center of the trimming region having the decided size matches the center of the trimming region set in steps S2007 to S2009.

In step S2011, the trimming region adjustment unit 1708 determines whether face cut has occurred by the trimming region set in step S2010. If NO in step S2011, processing in FIG. 20 ends; otherwise, the process advances to step S2012. In step S2012, the trimming region adjustment unit 1708 adjusts the trimming region as described above.

As has been described above, according to this embodiment, the final trimming region can be set without setting the interim initial trimming region described with reference to the second embodiment, and album creation reflecting the user's intention can be performed.

Each embodiment described above has exemplified a case assuming an album creation application. The present invention may be applicable to other image selection processing such that a favorite image is automatically selected. In addition, the image processing apparatus 100 is exemplified as a desktop personal computer, but a portable smart device may be used as the image processing apparatus 100. In addition, each embodiment is implemented in an arrangement assuming a local environment, but may be implemented by, for example, using an image stored in a server or uploading an image Other Embodiments Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-049055, filed Mar. 14, 2017, which is hereby incorporated by reference herein in its entirety.

What is claimed is:

1. An image processing apparatus comprising:
   a scene determination unit configured to determine a scene type represented by a plurality of images by analyzing the plurality of images;
   a position determination unit configured to determine, in an image included in the plurality of images, a position of a part which is to be laid out in a slot in a template and which has (1) a specific shape corresponding to the slot and (2) a specific size, in accordance with the scene type determined by the scene determination unit; and
   a layout unit configured to select the image from the plurality of images based on the scene type, and to lay out the part corresponding to the position determined by the position determination unit, in the slot,
   wherein the layout unit selects a first image to be laid out in a first slot, in accordance with a first criterion which is based on the scene type, and selects a second image to be laid out in a second slot, in accordance with a second criterion which is different from the first criterion and is based on the scene type.

2. The apparatus according to claim 1, further comprising a trimming unit configured to trim the part from the image,
   wherein the layout unit lays out the part trimmed by the trimming unit, in the slot.

3. The apparatus according to claim 1, wherein the image which is the layout target is an image which is a layout target in an album creation application.

4. The apparatus according to claim 1, wherein the position determination unit determines a position of the part based on a reference position defining a position spaced apart from a specific object by a distance corresponding to the scene type represented by the image.

5. The apparatus according to claim 1, wherein the position determination unit determines a position of the part so that the part includes a specific object in accordance with the scene type.

6. The apparatus according to claim 5, further comprising a specifying unit configured to specify, as the specific object, an object satisfying a condition from a plurality of objects included in the image.

7. The apparatus according to claim 6, wherein the condition is concerned with a position of the specific object.

8. The apparatus according to claim 6, wherein the condition is concerned with a size of the specific object.

9. The apparatus according to claim 5, wherein the specific object includes a face of a person.

10. An image processing apparatus comprising:
    a scene determination unit configured to determine a scene type represented by an image by analyzing the image;
    a position determination unit configured to determine, in the image, a position of a part which is to be laid out in a slot in a template and which has (1) a specific shape corresponding to the slot and (2) a specific size, in accordance with the scene type determined by the scene determination unit; and
    a layout unit configured to lay out the part corresponding to the position determined by the position determination unit, in the slot,
    wherein the position determination unit determines a position of a default part in the image and decides a moving amount corresponding to the scene type represented by the image, and determines a position which is moved from the position of the default part in accordance with the moving amount, as the position of the part to be laid out.

11. The apparatus according to claim 10, wherein the default part includes a specific object at a center of the default part.

12. The apparatus according to claim 10, wherein an image which is a layout target is selected from a plurality of images.

13. The apparatus according to claim 12, wherein the scene determination unit determines the scene type represented by the plurality of images by analyzing the plurality of images.

14. The apparatus according to claim 13, further comprising a scoring unit configured to perform scoring based on feature amounts of the plurality of images,
    wherein the scene determination unit determines the scene type represented by the plurality of images based on scores obtained by the scoring unit.

15. The apparatus according to claim 13, wherein the layout unit selects images to be laid out in slots, from the plurality of images, based on the scene type represented by the plurality of images, and
    wherein the layout unit lays out at least part of the selected images in the slots.

16. The apparatus according to claim 15, wherein the layout unit selects a first image to be laid out in a first slot, in accordance with a first criterion which is based on the scene type, and selects a second image to be laid out in a second slot, in accordance with a second criterion which is different from the first criterion and is based on the scene type.

17. The apparatus according to claim 16, wherein a size of the first slot is different from a size of the second slot.

18. A method to be executed in an image processing apparatus, the method comprising:
- determining a scene type represented by a plurality of images by analyzing the plurality of images;
- deciding, in an image included in the plurality of images, a position of a part which is to be laid out in a slot in a template and which has (1) a specific shape corresponding to the slot and (2) a specific size, in the image in accordance with the determined scene type; and
- selecting the image from the plurality of images based on the scene type, and laying out the part corresponding to the decided position in the image, in the slot,
- wherein the selecting selects a first image to be laid out in a first slot, in accordance with a first criterion which is based on the scene type, and selects a second image to be laid out in a second slot, in accordance with a second criterion which is different from the first criterion and is based on the scene type.

19. A non-transitory computer-readable storage medium storing a program which causes a computer to execute a method comprising:
- determining a scene type represented by a plurality of images by analyzing the plurality of images;
- deciding, in an image included in the plurality of images, a position of a part which is to be laid out in a slot in a template and which has (1) a specific shape corresponding to the slot and (2) a specific size, in the image in accordance with the determined scene type; and
- selecting the image from the plurality of images based on the scene type, and laying out the part corresponding to the decided position in the image, in the slot,
- wherein the selecting selects a first image to be laid out in a first slot, in accordance with a first criterion which is based on the scene type, and selects a second image to be laid out in a second slot, in accordance with a second criterion which is different from the first criterion and is based on the scene type.

20. An image processing method comprising:
- determining a scene type represented by an image by analyzing the image;
- determining, in the image, a position of a part which is to be laid out in a slot in a template and which has (1) a specific shape corresponding to the slot and (2) a specific size, in accordance with the determined scene type; and
- laying out the part corresponding to the determined position, in the slot,
- wherein the position determining determines a position of a default part in the image and decides a moving amount corresponding to the scene type represented by the image, and determines a position which is moved from the position of the default part in accordance with the moving amount, as the position of the part to be laid out.

* * * * *